(12) United States Patent
Xu et al.

(10) Patent No.: US 10,534,660 B2
(45) Date of Patent: Jan. 14, 2020

(54) RESPONSE MESSAGE PROCESSING METHOD, APPARATUS, AND SYSTEM

(71) Applicants: Huawei Technologies Co., Ltd., Shenzhen (CN); University of Electronic Science and Technology of China, Chengdu (CN)

(72) Inventors: Yang Xu, Chengdu (CN); Yarui Wang, Chengdu (CN); Yan Li, Chengdu (CN)

(73) Assignees: Huawei Technologies Co., Ltd., Shenzhen (CN); University of Electronic Science and Technology of China, Chengdu (CN)

( * ) Notice: Subject to any disclaimer, the term of this patent is extended or adjusted under 35 U.S.C. 154(b) by 150 days.

(21) Appl. No.: 15/644,588

(22) Filed: Jul. 7, 2017

(65) Prior Publication Data

US 2017/0308428 A1 Oct. 26, 2017

Related U.S. Application Data

(63) Continuation of application No. PCT/CN2015/070286, filed on Jan. 7, 2015.

(51) Int. Cl.
*G06F 11/00* (2006.01)
*G06F 11/07* (2006.01)
*H04W 4/70* (2018.01)

(52) U.S. Cl.
CPC ...... *G06F 11/0793* (2013.01); *G06F 11/0709* (2013.01); *G06F 11/079* (2013.01); *G06F 11/0751* (2013.01); *H04W 4/70* (2018.02)

(58) Field of Classification Search
CPC .......................... G06F 11/0793; G06F 11/1625
See application file for complete search history.

(56) References Cited

U.S. PATENT DOCUMENTS 8,325,614 B2 12/2012 Poon et al.
8,631,466 B2 1/2014 Cha et al.
(Continued)

FOREIGN PATENT DOCUMENTS

CN 101877696 A 11/2010
CN 101902681 A 12/2010
(Continued)

OTHER PUBLICATIONS

Blanz "CMDH Refinement," ONEM2M-ARC-2013-0397R01-CMDH REFINEMENT.PPT, ONEM2M, vol. WG2—Architecture, pp. 1-13, XP084003423 (Oct. 6, 2013).
(Continued)

*Primary Examiner* — Christopher S McCarthy
(74) *Attorney, Agent, or Firm* — Leydig, Voit & Mayer, Ltd.

(57) ABSTRACT

The present invention provides a response message processing method, apparatus, and system, and relates to the communications field. The method includes: sending, according to a device identifier sent by a request device, a query request to a destination device corresponding to the device identifier, so that the destination device returns a response message according to the query request; generating substitution data when an error occurs in the response message, where the substitution data is associated with resource data requested by the query request and is used to substitute for the resource data requested by the query request; and sending response substitution information to the request device, where the response substitution information includes the substitution data and the device identifier.

28 Claims, 15 Drawing Sheets

(56) References Cited

U.S. PATENT DOCUMENTS

| | | | |
|---|---|---|---|
| 8,767,630 B1 | 7/2014 | Collins et al. | |
| 9,348,701 B2* | 5/2016 | Foti | H04W 4/70 |
| 9,894,166 B2* | 2/2018 | Wu | H04W 4/70 |
| 2010/0281311 A1 | 11/2010 | Gao et al. | |
| 2012/0290872 A1 | 11/2012 | He et al. | |
| 2014/0215043 A1* | 7/2014 | Ryu | H04W 4/70 709/223 |
| 2014/0221032 A1* | 8/2014 | Yang | H04W 4/70 455/509 |
| 2014/0233514 A1 | 8/2014 | Lee et al. | |
| 2015/0055640 A1* | 2/2015 | Wang | H04W 60/00 370/338 |
| 2016/0007137 A1 | 1/2016 | Ahn et al. | |
| 2016/0286516 A1 | 9/2016 | Wu | |
| 2016/0294886 A1 | 10/2016 | Wu | |
| 2016/0323695 A1* | 11/2016 | Yu | H04W 8/24 |
| 2017/0048160 A1* | 2/2017 | Wu | H04L 67/16 |
| 2017/0099562 A1* | 4/2017 | Bhalla | H04L 41/0803 |
| 2017/0332426 A1* | 11/2017 | Wu | H04W 4/70 |
| 2018/0199175 A1* | 7/2018 | Wu | H04W 60/00 |

FOREIGN PATENT DOCUMENTS

| | | |
|---|---|---|
| CN | 101932068 A | 12/2010 |
| CN | 102111280 A | 6/2011 |
| CN | 102883309 A | 1/2013 |
| CN | 103891175 A | 6/2014 |
| EP | 2445165 A1 | 4/2012 |
| EP | 2961122 A1 | 12/2015 |
| EP | 3060018 A1 | 8/2016 |
| KR | 20140099663 A | 8/2014 |
| WO | 2014129802 A1 | 8/2014 |
| WO | 2014169804 A1 | 10/2014 |
| WO | 2014183668 A1 | 11/2014 |

OTHER PUBLICATIONS

Blanz et al. "Delivery Handling in CSE," ONEM2M-ARC-2013-0285-DELI VERY_HANDLING_IN_CSE. DOC, ONEM2M, vol. WG2—Architecture, ARC, pp. 1-16, XP084002327 (Jun. 9, 2013).

"Machine-to-Machine Communications (M2M); mla, dla, and mld interfaces," ETSI TS 102 921 V1.1.1, pp. 1-538, European Telecommunications Standards Institute, Sophia Antipolis Cedex, France (Feb. 2012).

CN201580072668.X, Office Action, dated Apr. 28, 2019.

\* cited by examiner

RESPONSE MESSAGE PROCESSING METHOD, APPARATUS, AND SYSTEM

CROSS-REFERENCE TO RELATED APPLICATIONS

This application is a continuation of International Application No. PCT/CN2015/070286, filed on Jan. 7, 2015. The disclosures of the aforementioned applications are hereby incorporated by reference in their entireties.

TECHNICAL FIELD

The present invention relates to the communications field, and in particular, to a response message processing method, apparatus, and system.

BACKGROUND

A machine-to-machine (M2M) technology is a networked application technology using machine intelligent interaction as a core. The existing International Organization for Standardization oneM2M is devoted to putting forward an M2M system based on this application technology. In a oneM2M environment, an M2M system using the M2M technology includes a common service entity (CSE).

In an implementation process of the M2M technology, a request device on which an M2M application program is installed first sends a list query request to the CSE. The CSE sends a device identifier (ID) list to the request device, and the request device selects a destination device ID from the device identifier list, and sends the device ID to the CSE. The CSE sends, according to the device ID, a query request to a destination device corresponding to the device identifier, to request resource data. The destination device returns a response message to the CSE according to the query request, and the CSE forwards the response message to the request device.

However, in a related technology, when a transmission error occurs in a response message, for example, when resource data of the response message is null or content of the resource data is incorrect, the CSE returns the null or incorrect resource data to the request device. As a result, it is possible that the request device cannot obtain a valid response message, and reliability of the M2M system is relatively low.

SUMMARY

To resolve a problem that reliability of an M2M system is relatively low, the present invention provides a response message processing method, apparatus, and system. The technical solutions are as follows:

According to a first aspect, a response message processing method is provided, is applied to a CSE, and includes:

sending, according to a device identifier sent by a request device, a query request to a destination device corresponding to the device identifier, so that the destination device returns a response message according to the query request;

generating substitution data when an error occurs in the response message, where the substitution data is associated with resource data requested by the query request and is used to substitute for the resource data requested by the query request; and sending response substitution information to the request device, where the response substitution information includes the substitution data and the device identifier.

With reference to the first aspect, in a first implementable manner of the first aspect, the generating substitution data includes:

obtaining a type of the destination device; and
generating the substitution data according to the type of the destination device.

With reference to the first implementable manner of the first aspect, in a second implementable manner of the first aspect, the type of the destination device is a sensing type, and a device of the sensing type is configured to sense a preset attribute in preset space; and the generating the substitution data according to the type of the destination device includes:

obtaining resource data that is of a sensing device of a same type as the destination device and that is located in the preset space; and generating the substitution data according to the resource data.

With reference to the second implementable manner of the first aspect, in a third implementable manner of the first aspect, the generating the substitution data according to the resource data includes:

if there are multiple pieces of the resource data, obtaining an average value of the multiple pieces of resource data and using the average value as the substitution data; or if there is one piece of the resource data, using the one piece of resource data as the substitution data.

With reference to the first implementable manner of the first aspect, in a fourth implementable manner of the first aspect, the type of the destination device is a steady output type, and an absolute value of a difference between pieces of resource data that are of a device of the steady output type and that are at adjacent moments is smaller than a preset value; and the generating the substitution data according to the type of the destination device includes:

obtaining resource data of the destination device at a previous moment and using the resource data as the substitution data.

With reference to the first implementable manner of the first aspect, in a fifth implementable manner of the first aspect, the type of the destination device is a predictable output type, and there is a preset function relationship between pieces of resource data that are of a device of the predictable output type and that are at adjacent moments; and the generating the substitution data according to the type of the destination device includes:

obtaining resource data of the destination device at a previous moment;

obtaining a correlation function of the destination device, where the correlation function is used to indicate a preset function relationship between the resource data at the previous moment and resource data at a current moment; and performing calculation according to the resource data at the previous moment and the correlation function, to obtain the substitution data.

With reference to any one of the first aspect to the fifth implementable manner of the first aspect, in a sixth implementable manner of the first aspect, the error in the response message includes a transmission error, and before the generating substitution data, the method further includes:

determining whether the transmission error occurs in the response message.

With reference to the sixth implementable manner of the first aspect, in a seventh implementable manner of the first aspect, the determining whether the transmission error occurs in the response message includes:

detecting whether the response message is received in a preset time period starting from a moment of sending the query request; and if the response message is not received, determining that the transmission error occurs in the response message.

With reference to the sixth implementable manner of the first aspect, in an eighth implementable manner of the first aspect, the determining whether the transmission error occurs in the response message includes:

receiving the response message sent by the destination device;

detecting whether content of the response message is null; and if the content of the response message is null, determining that the transmission error occurs in the response message.

With reference to any one of the first aspect to the fifth implementable manner of the first aspect, in a ninth implementable manner of the first aspect, the error in the response message includes a content error, and before the generating substitution data, the method further includes:

receiving the response message sent by the destination device;

sending the response message to the request device, so that the request device determines whether the content error occurs in the response message; and receiving a re-retrieval message sent by the request device, where the re-retrieval message is generated when the request device determines that the content error occurs in the response message, and is used to indicate that the content error occurs in the response message.

With reference to any one of the first aspect to the ninth implementable manner of the first aspect, in a tenth implementable manner of the first aspect, the response substitution information further includes an information substitution identifier, and the information substitution identifier is used to indicate whether the resource data requested by the query request is substituted.

According to a second aspect, a response message processing method is provided, is applied to a request device, and includes:

sending a device identifier to a CSE, so that the CSE sends, according to the device identifier, a query request to a destination device corresponding to the device identifier; and receiving response substitution information sent by the CSE, where the response substitution information is generated by the CSE when an error occurs in a response message sent by the destination device, the substitution data is associated with resource data requested by the query request and is used to substitute for the resource data requested by the query request, and the response substitution information includes the substitution data and the device identifier.

With reference to the second aspect, in a first implementable manner of the second aspect, before the receiving response substitution information sent by the CSE, the method further includes:

receiving a response message sent by the CSE;

detecting whether resource data in the response message conforms to a preset rule;

if the resource data in the response message does not conform to the preset rule, determining that a content error occurs in the response message;

generating a re-retrieval message, where the re-retrieval message is used to indicate that the content error occurs in the response message; and sending the re-retrieval message to the CSE.

With reference to the second aspect or the first implementable manner of the second aspect, in a second implementable manner of the second aspect, the response substitution information further includes an information substitution identifier, and the information substitution identifier is used to indicate whether the resource data requested by the query request is substituted; and after the receiving response substitution information sent by the CSE, the method further includes:

detecting the information substitution identifier; and determining, according to a detection result, whether the resource data requested by the query request is substituted.

According to a third aspect, a response message processing apparatus is provided and is applied to a CSE, and the response message processing apparatus includes:

a first sending unit, configured to send, according to a device identifier sent by a request device, a query request to a destination device corresponding to the device identifier, so that the destination device returns a response message according to the query request;

a generation unit, configured to generate substitution data when an error occurs in the response message, where the substitution data is associated with resource data requested by the query request and is used to substitute for the resource data requested by the query request; and a second sending unit, configured to send response substitution information to the request device, where the response substitution information includes the substitution data and the device identifier.

With reference to the third aspect, in a first implementable manner of the third aspect, the generation unit includes:

an obtaining module, configured to obtain a type of the destination device; and a generation module, configured to generate the substitution data according to the type of the destination device.

With reference to the first implementable manner of the third aspect, in a second implementable manner of the third aspect, the type of the destination device is a sensing type, and a device of the sensing type is configured to sense a preset attribute in preset space; and the generation module includes:

a first obtaining submodule, configured to obtain resource data that is of a sensing device of a same type as the destination device and that is located in the preset space; and a first generation submodule, configured to generate the substitution data according to the resource data.

With reference to the second implementable manner of the third aspect, in a third implementable manner of the third aspect, the first generation submodule is specifically configured to:

if there are multiple pieces of the resource data, obtain an average value of the multiple pieces of resource data and use the average value as the substitution data; or if there is one piece of the resource data, use the one piece of resource data as the substitution data.

With reference to the first implementable manner of the third aspect, in a fourth implementable manner of the third aspect, the type of the destination device is a steady output type, and an absolute value of a difference between pieces of resource data that are of a device of the steady output type and that are at adjacent moments is smaller than a preset value; and the generation module includes:

a second obtaining submodule, configured to obtain resource data of the destination device at a previous moment and use the resource data as the substitution data.

With reference to the first implementable manner of the third aspect, in a fifth implementable manner of the third aspect, the type of the destination device is a predictable output type, and there is a preset function relationship between pieces of resource data that are of a device of the predictable output type and that are at adjacent moments; and the generation module includes:

a third obtaining submodule, configured to obtain resource data of the destination device at a previous moment;

a fourth obtaining submodule, configured to obtain a correlation function of the destination device, where the correlation function is used to indicate a preset function relationship between the resource data at the previous moment and resource data at a current moment; and a calculation module, configured to perform calculation according to the resource data at the previous moment and the correlation function, to obtain the substitution data.

With reference to any one of the third aspect to the fifth implementable manner of the third aspect, in a sixth implementable manner of the third aspect, the error in the response message includes a transmission error, and the response message processing apparatus further includes:

a judging unit, configured to determine whether the transmission error occurs in the response message.

With reference to the sixth implementable manner of the third aspect, in a seventh implementable manner of the third aspect, the judging unit includes:

a first detection module, configured to detect whether the response message is received in a preset time period starting from a moment of sending the query request; and a first determining module, configured to: when the response message is not received, determine that the transmission error occurs in the response message.

With reference to the sixth implementable manner of the third aspect, in an eighth implementable manner of the third aspect, the judging unit includes:

a receiving module, configured to receive the response message sent by the destination device;

a second detection module, configured to detect whether content of the response message is null; and a second determining module, configured to: when the content of the response message is null, determine that the transmission error occurs in the response message.

With reference to any one of the third aspect to the fifth implementable manner of the third aspect, in a ninth implementable manner of the third aspect, the error in the response message includes a content error, and the response message processing apparatus further includes:

a first receiving unit, configured to receive the response message sent by the destination device;

a third sending unit, configured to send the response message to the request device, so that the request device determines whether the content error occurs in the response message; and a second receiving unit, configured to receive a re-retrieval message sent by the request device, where the re-retrieval message is generated when the request device determines that the content error occurs in the response message, and is used to indicate that the content error occurs in the response message.

With reference to any one of the third aspect to the ninth implementable manner of the third aspect, in a tenth implementable manner of the third aspect, the response substitution information further includes an information substitution identifier, and the information substitution identifier is used to indicate whether the resource data requested by the query request is substituted.

According to a fourth aspect, a response message processing apparatus is provided, is applied to a request device, and includes:

a first sending unit, configured to send a device identifier to a CSE, so that the CSE sends, according to the device identifier, a query request to a destination device corresponding to the device identifier; and a first receiving unit, configured to receive response substitution information sent by the CSE, where the response substitution information is generated by the CSE when an error occurs in a response message sent by the destination device, the substitution data is associated with resource data requested by the query request and is used to substitute for the resource data requested by the query request, and the response substitution information includes the substitution data and the device identifier.

With reference to the fourth aspect, in a first implementable manner of the fourth aspect, the response message processing apparatus further includes:

a second receiving unit, configured to receive a response message sent by the CSE;

a first detection unit, configured to detect whether resource data in the response message conforms to a preset rule;

a first determining unit, configured to: if the resource data in the response message does not conform to the preset rule, determine that a content error occurs in the response message;

a generation unit, configured to generate a re-retrieval message, where the re-retrieval message is used to indicate that the content error occurs in the response message; and a second sending unit, configured to send the re-retrieval message to the CSE.

With reference to the fourth aspect or the first implementable manner of the fourth aspect, in a second implementable manner of the fourth aspect, the response substitution information further includes an information substitution identifier, the information substitution identifier is used to indicate whether the resource data requested by the query request is substituted, and the response message processing apparatus further includes:

a second detection unit, configured to detect the information substitution identifier; and a second determining unit, configured to determine, according to a detection result, whether the resource data requested by the query request is substituted.

According to a fifth aspect, a response message processing system is provided, including:

a CSE, a request device, and a destination device; where the CSE includes the response message processing apparatus according to any one of the third aspect or the implementable manners of the third aspect; and the request device includes the response message processing apparatus according to any one of the fourth aspect or the implementable manners of the fourth aspect.

According to a sixth aspect, a response message processing apparatus is provided, and is applied to a CSE, including:

at least one processor, at least one network interface, a memory, and at least one communications bus, where the processor is configured to execute a program stored in the memory, and the program includes:

sending, according to a device identifier sent by a request device, a query request to a destination device corresponding to the device identifier, so that the destination device returns a response message according to the query request;

generating substitution data when an error occurs in the response message, where the substitution data is associated with resource data requested by the query request and is used to substitute for the resource data requested by the query request; and sending response substitution information to the request device, where the response substitution information includes the substitution data and the device identifier.

With reference to the sixth aspect, in a first implementable manner of the sixth aspect, the generating substitution data includes:

obtaining a type of the destination device; and generating the substitution data according to the type of the destination device.

With reference to the first implementable manner of the sixth aspect, in a second implementable manner of the sixth aspect, the type of the destination device is a sensing type, and a device of the sensing type is configured to sense a preset attribute in preset space; and the generating the substitution data according to the type of the destination device includes:

obtaining resource data that is of a sensing device of a same type as the destination device and that is located in the preset space; and generating the substitution data according to the resource data.

With reference to the second implementable manner of the sixth aspect, in a third implementable manner of the sixth aspect, the generating the substitution data according to the resource data includes:

if there are multiple pieces of the resource data, obtaining an average value of the multiple pieces of resource data and using the average value as the substitution data; or if there is one piece of the resource data, using the one piece of resource data as the substitution data.

With reference to the first implementable manner of the sixth aspect, in a fourth implementable manner of the sixth aspect, the type of the destination device is a steady output type, and an absolute value of a difference between pieces of resource data that are of a device of the steady output type and that are at adjacent moments is smaller than a preset value; and the generating the substitution data according to the type of the destination device includes:

obtaining resource data of the destination device at a previous moment and using the resource data as the substitution data.

With reference to the first implementable manner of the sixth aspect, in a fifth implementable manner of the sixth aspect, the type of the destination device is a predictable output type, and there is a preset function relationship between pieces of resource data that are of a device of the predictable output type and that are at adjacent moments; and the generating the substitution data according to the type of the destination device includes:

obtaining resource data of the destination device at a previous moment;

obtaining a correlation function of the destination device, where the correlation function is used to indicate a preset function relationship between the resource data at the previous moment and resource data at a current moment; and performing calculation according to the resource data at the previous moment and the correlation function, to obtain the substitution data.

With reference to any one of the sixth aspect to the fifth implementable manner of the sixth aspect, in a sixth implementable manner of the sixth aspect, the error in the response message includes a transmission error, and the program further includes:

determining whether the transmission error occurs in the response message.

With reference to the sixth implementable manner of the sixth aspect, in a seventh implementable manner of the sixth aspect, the determining whether the transmission error occurs in the response message includes:

detecting whether the response message is received in a preset time period starting from a moment of sending the query request; and if the response message is not received, determining that the transmission error occurs in the response message.

With reference to the sixth implementable manner of the sixth aspect, in an eighth implementable manner of the sixth aspect, the determining whether the transmission error occurs in the response message includes:

receiving the response message sent by the destination device;

detecting whether content of the response message is null; and if the content of the response message is null, determining that the transmission error occurs in the response message.

With reference to any one of the sixth aspect to the fifth implementable manner of the sixth aspect, in a ninth implementable manner of the sixth aspect, the error in the response message includes a content error, and the program further includes:

receiving the response message sent by the destination device;

sending the response message to the request device, so that the request device determines whether the content error occurs in the response message; and receiving a re-retrieval message sent by the request device, where the re-retrieval message is generated when the request device determines that the content error occurs in the response message, and is used to indicate that the content error occurs in the response message.

With reference to any one of the sixth aspect to the ninth implementable manner of the sixth aspect, in a tenth implementable manner of the sixth aspect, the response substitution information further includes an information substitution identifier, and the information substitution identifier is used to indicate whether the resource data requested by the query request is substituted.

According to a seventh aspect, a response message processing apparatus is provided, is applied to a request device, and includes:

a transmitter, configured to send a device identifier to a CSE, so that the CSE sends, according to the device identifier, a query request to a destination device corresponding to the device identifier; and a receiver, configured to receive response substitution information sent by the CSE, where the response substitution information is generated by the CSE when an error occurs in a response message sent by the destination device, the substitution data is associated with resource data requested by the query request and is used to substitute for the resource data requested by the query request, and the response substitution information includes the substitution data and the device identifier.

With reference to the seventh aspect, in a first implementable manner of the seventh aspect, the receiver is further configured to receive a response message sent by the CSE; and the response message processing apparatus further includes a processor, configured to:

detect whether resource data in the response message conforms to a preset rule;

if the resource data in the response message does not conform to the preset rule, determine that a content error occurs in the response message;

generate a re-retrieval message, where the re-retrieval message is used to indicate that the content error occurs in the response message; and send the re-retrieval message to the CSE.

With reference to the seventh aspect or the first implementable manner of the seventh aspect, in a second implementable manner of the seventh aspect, the response substitution information further includes an information substitution identifier, and the information substitution identifier is used to indicate whether the resource data requested by the query request is substituted; and the response message processing apparatus further includes the processor, configured to:

detect the information substitution identifier; and determine, according to a detection result, whether the resource data requested by the query request is substituted.

According to an eighth aspect, a response message processing system is provided, including:

a CSE, a request device, and a destination device; where the CSE includes the response message processing apparatus according to any one of the sixth aspect or the implementable manners of the sixth aspect; and the request device includes the response message processing apparatus according to any one of the seventh aspect or the implementable manners of the seventh aspect.

Beneficial effects of the technical solutions provided in the present invention include:

The present invention provides a response message processing method, apparatus, and system. A CSE sends, according to a device ID sent by a request device, a query request to a corresponding destination device; and when an error occurs in a response message returned by the destination device according to the query request, the CSE may generate substitution data, to substitute for resource data requested by the query request, and send response substitution information to the request device according to the substitution data, so that the request device obtains valid resource data. Therefore, reliability of an M2M system is improved.

BRIEF DESCRIPTION OF DRAWINGS

To describe technical solutions in embodiments of the present invention more clearly, the following briefly describes the accompanying drawings for describing the embodiments. The accompanying drawings in the following description show merely some embodiments of the present invention, and persons of ordinary skill in the art may still derive other drawings from these accompanying drawings without creative efforts.

DESCRIPTION OF EMBODIMENTS

To make objectives, technical solutions, and advantages of the present invention clearer, the following further describes embodiments of the present invention in detail with reference to the accompanying drawings.

Figure 1:
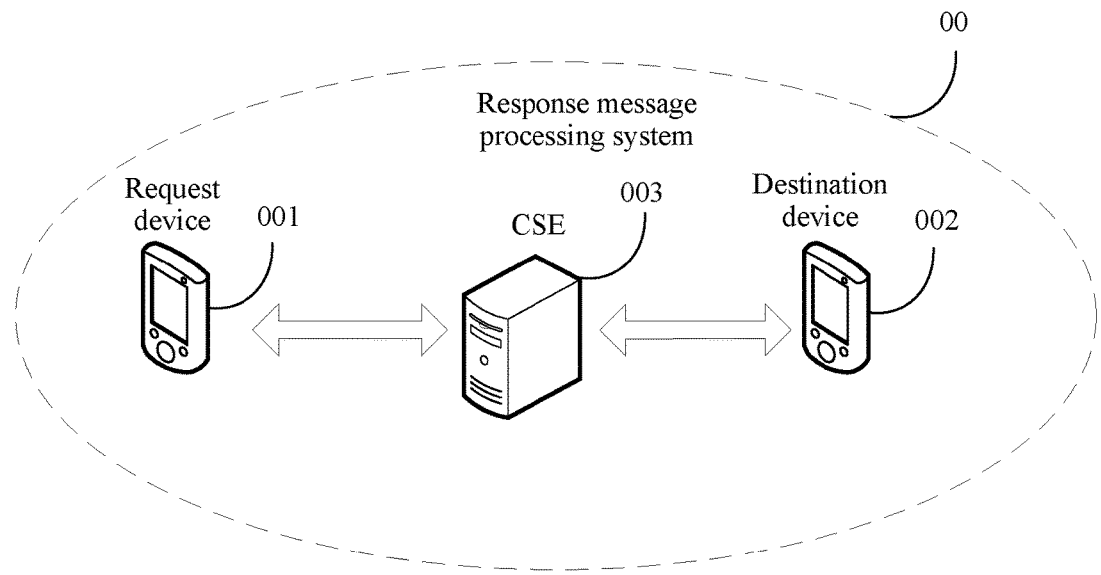
FIG. 1 is a schematic structural diagram of a response message processing system to which a response message processing method relates according to an embodiment of the present invention.

FIG. 1 is a schematic structural diagram of a response message processing system 00 to which a response message processing method relates according to an embodiment of the present invention. The response message processing system 00 is applied to an M2M system. An M2M technology is a networked application technology in which machine intelligent interaction is used as a core. In the response message processing system, multiple communications technologies of different types are organically combined by using the M2M technology, to implement communication between machines. The response message processing system 00 includes: a request device 001, a destination device 002, and a CSE 003.

The request device 001 and the destination device 002 may be a machine device, such as a mobile phone, a telephone, a computer, and a fax machine. An M2M application program that may send a query request to the CSE 003 is installed on the request device 001. The destination device 002 is a machine device that responds to the query request of the request device 001. The CSE 003 is an entity that includes a group of common service function (CSF) modules specified in a oneM2M environment. As a management platform in the M2M system, the CSE 003 is configured to manage all devices in the response message processing system 00, so that communication between the request device 001 and the destination device 002 can be implemented.

Figure 2:
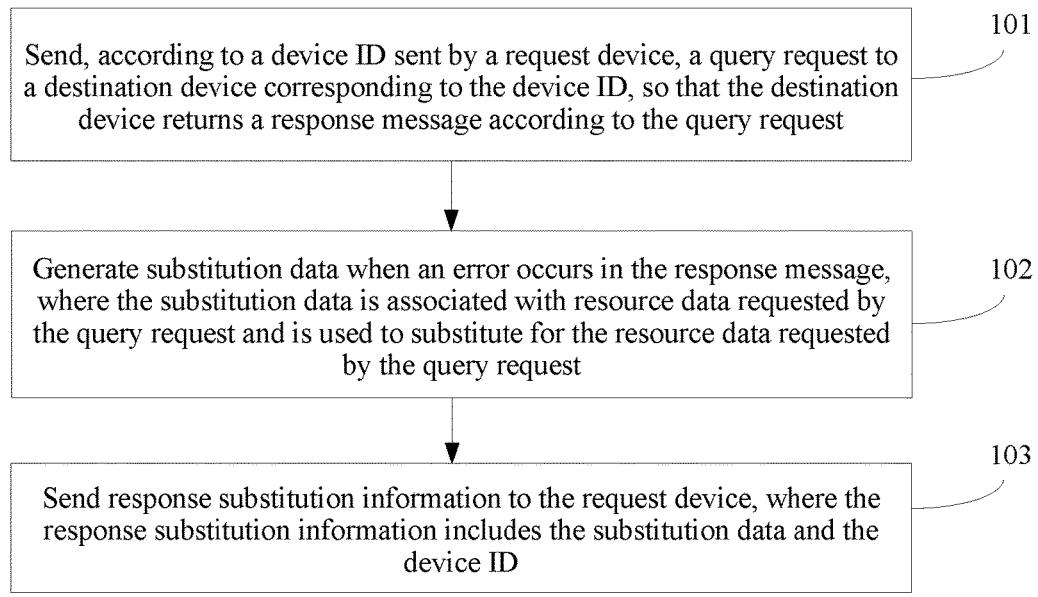
FIG. 2 is a flowchart of a response message processing method according to an embodiment of the present invention.

An embodiment of the present invention provides a response message processing method. The method may be applied to the CSE 003 in the response message processing system 00 shown in FIG. 1. As shown in FIG. 2, the method includes:

Step 101: Send, according to a device ID sent by a request device, a query request to a destination device corresponding to the device ID, so that the destination device returns a response message according to the query request.

Step 102: Generate substitution data when an error occurs in the response message, where the substitution data is associated with resource data requested by the query request and is used to substitute for the resource data requested by the query request.

Step 103: Send response substitution information to the request device, where the response substitution information includes the substitution data and the device ID.

In the response message processing method provided in this embodiment of the present invention, a CSE sends, according to a device ID sent by a request device, a query request to a destination device corresponding to the device ID; and when an error occurs in a response message returned by the destination device according to the query request, the CSE may generate substitution data, to substitute for resource data requested by the query request, and send response substitution information to the request device according to the substitution data, so that the request device obtains valid resource data. Therefore, reliability of an M2M system is improved.

Specifically, the generating substitution data includes: obtaining a type of the destination device, and generating the substitution data according to the type of the destination device.

The type of the destination device may be a sensing type, and a device of the sensing type is configured to sense a preset attribute in preset space. Therefore, the generating the substitution data according to the type of the destination device may include: obtaining resource data that is of a sensing device of a same type as the destination device and that is located in the preset space, and generating the substitution data according to the resource data.

The generating the substitution data according to the resource data may include: if there are multiple pieces of resource data, obtaining an average value of the multiple pieces of resource data and using the average value as the substitution data; or if there is one piece of resource data, using the one piece of resource data as the substitution data.

Alternatively, the type of the destination device may be a steady output type, and an absolute value of a difference between pieces of resource data that are of a device of the steady output type and that are at adjacent moments is smaller than a preset value. Therefore, the generating the substitution data according to the type of the destination device may include: obtaining resource data of the destination device at a previous moment and using the resource data as the substitution data.

Alternatively, the type of the destination device may be a predictable output type, and there is a preset function relationship between pieces of resource data that are of a device of the predictable output type and that are at adjacent moments. Therefore, the generating the substitution data according to the type of the destination device may include: obtaining resource data of the destination device at a previous moment; obtaining a correlation function of the destination device, where the correlation function is used to indicate a preset function relationship between the resource data at the previous moment and resource data at a current moment; and performing calculation according to the resource data at the previous moment and the correlation function, to obtain the substitution data.

Further, the error in the response message may include a transmission error. Therefore, before step 102, the method may further include: determining whether the transmission error occurs in the response message.

On one hand, the determining whether the transmission error occurs in the response message may include: detecting whether the response message is received in a preset time period starting from a moment of sending the query request; and if the response message is not received, determining that the transmission error occurs in the response message.

On the other hand, the determining whether the transmission error occurs in the response message may also include: receiving the response message sent by the destination device; detecting whether content of the response message is null; and if the content of the response message is null, determining that the transmission error occurs in the response message.

The error in the response message may further include a content error. Therefore, before step 102, the method may further include: receiving the response message sent by the destination device; sending the response message to the request device, so that the request device determines whether the content error occurs in the response message; and receiving a re-retrieval message sent by the request device, where the re-retrieval message is generated when the request device determines that the content error occurs in the response message, and is used to indicate that the content error occurs in the response message.

The response substitution information in step 103 further includes an information substitution identifier, and the information substitution identifier is used to indicate whether the resource data requested by the query request is substituted.

In the response message processing method provided in this embodiment of the present invention, a CSE sends, according to a device ID sent by a request device, a query request to a destination device corresponding to the device ID; and when an error occurs in a response message returned by the destination device according to the query request, the CSE may generate substitution data, to substitute for resource data requested by the query request, and send response substitution information to the request device according to the substitution data, so that the request device obtains valid resource data. Therefore, reliability of an M2M system is improved.

Figure 3:
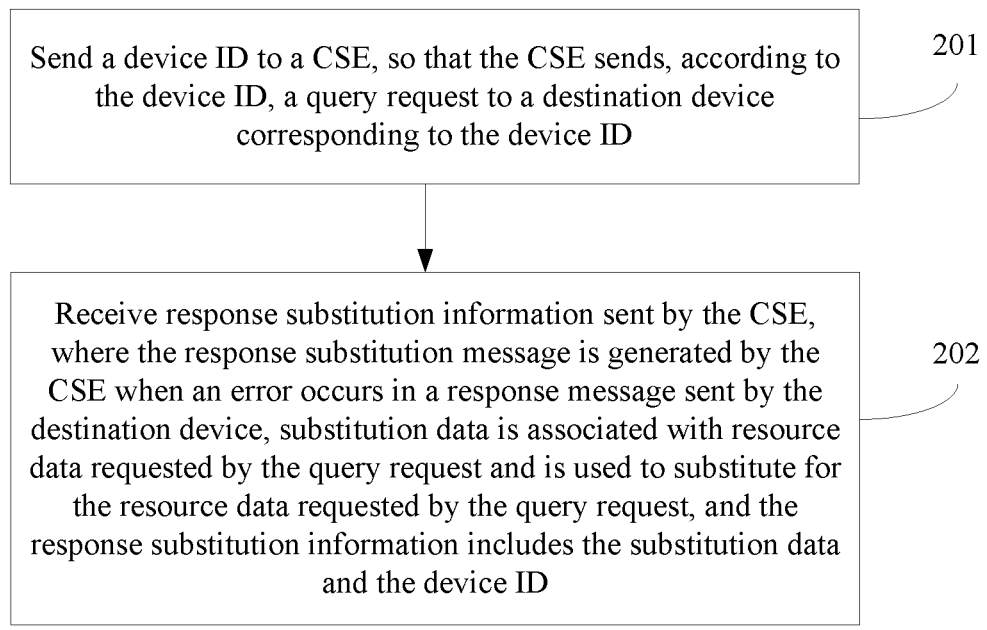
FIG. 3 is a flowchart of another response message processing method according to an embodiment of the present invention.

An embodiment of the present invention provides another response message processing method. The method may be applied to the request device 001 in the response message processing system 00 shown in FIG. 1. As shown in FIG. 3, the method includes:

Step 201: Send a device ID to a CSE, so that the CSE sends, according to the device ID, a query request to a destination device corresponding to the device ID.

Step 202: Receive response substitution information sent by the CSE, where the response substitution information is generated by the CSE when an error occurs in a response message sent by the destination device, substitution data is associated with resource data requested by the query request and is used to substitute for the resource data requested by the query request, and the response substitution information includes the substitution data and the device ID.

In the response message processing method provided in this embodiment of the present invention, a CSE sends, according to a device ID sent by a request device, a query request to a destination device corresponding to the device ID; and when an error occurs in a response message returned by the destination device according to the query request, the CSE may generate substitution data, to substitute for resource data requested by the query request, and send response substitution information to the request device according to the substitution data, so that the request device obtains valid resource data. Therefore, reliability of an M2M system is improved.

It should be noted that before step 202, the method may further include: receiving a response message sent by the CSE; detecting whether resource data in the response message conforms to a preset rule; if the resource data in the response message does not conform to the preset rule, determining that a content error occurs in the response message; generating a re-retrieval message, where the re-retrieval message is used to indicate that the content error occurs in the response message; and sending the re-retrieval message to the CSE.

The response substitution information sent by the CSE further includes an information substitution identifier, and the information substitution identifier is used to indicate whether the resource data requested by the query request is substituted. Correspondingly, after step 202, the method may further include: detecting the information substitution identifier; and determining, according to a detection result, whether the resource data requested by the query request is substituted.

In the response message processing method provided in this embodiment of the present invention, a CSE sends, according to a device ID sent by a request device, a query request to a destination device corresponding to the device ID; and when an error occurs in a response message returned by the destination device according to the query request, the CSE may generate substitution data, to substitute for resource data requested by the query request, and send response substitution information to the request device according to the substitution data, so that the request device obtains valid resource data. Therefore, reliability of an M2M system is improved.

Figure 4A:
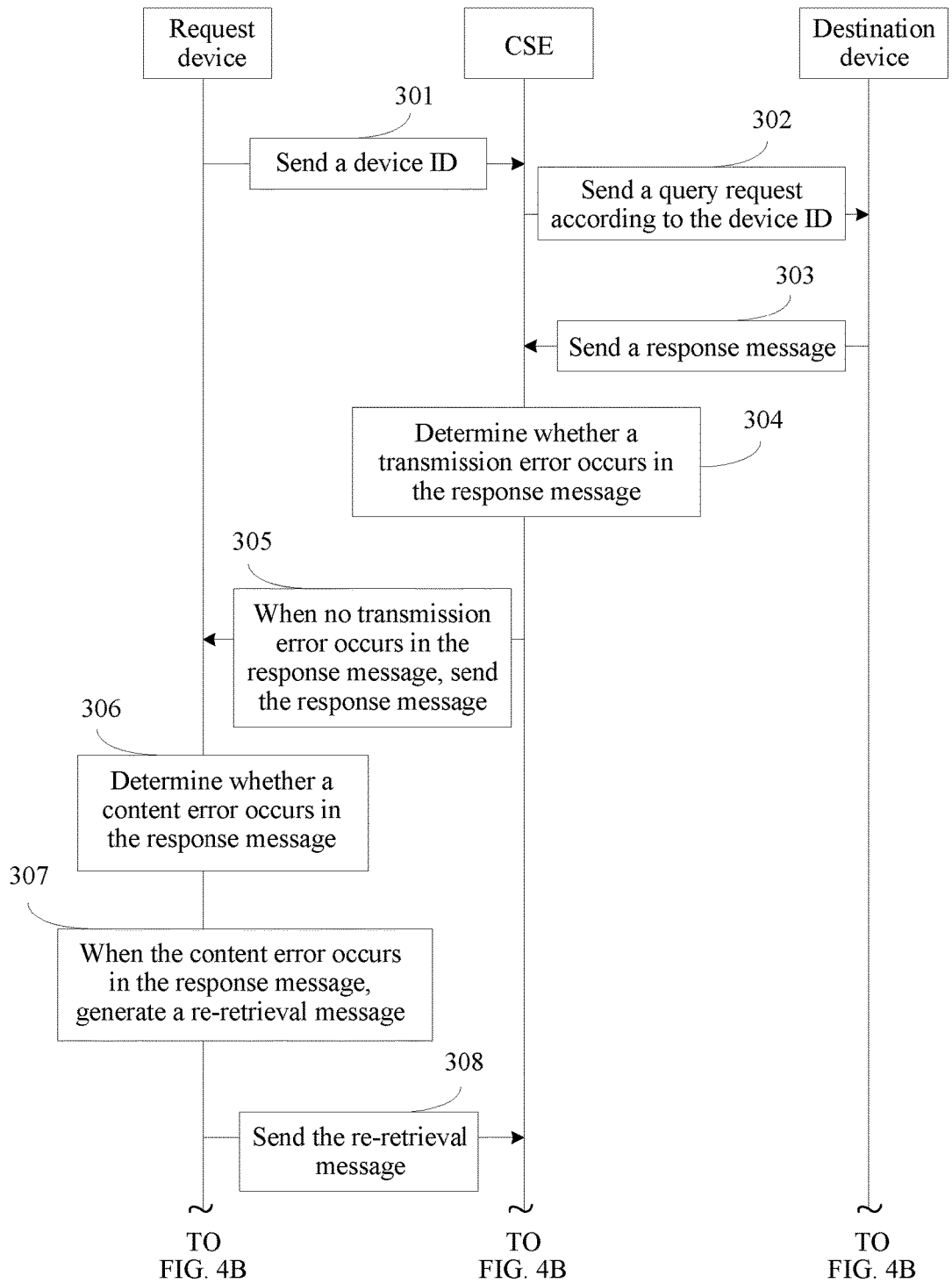
FIG. 4A and FIG. 4B are a flowchart of still another response message processing method according to an embodiment of the present invention.
Figure 4B:
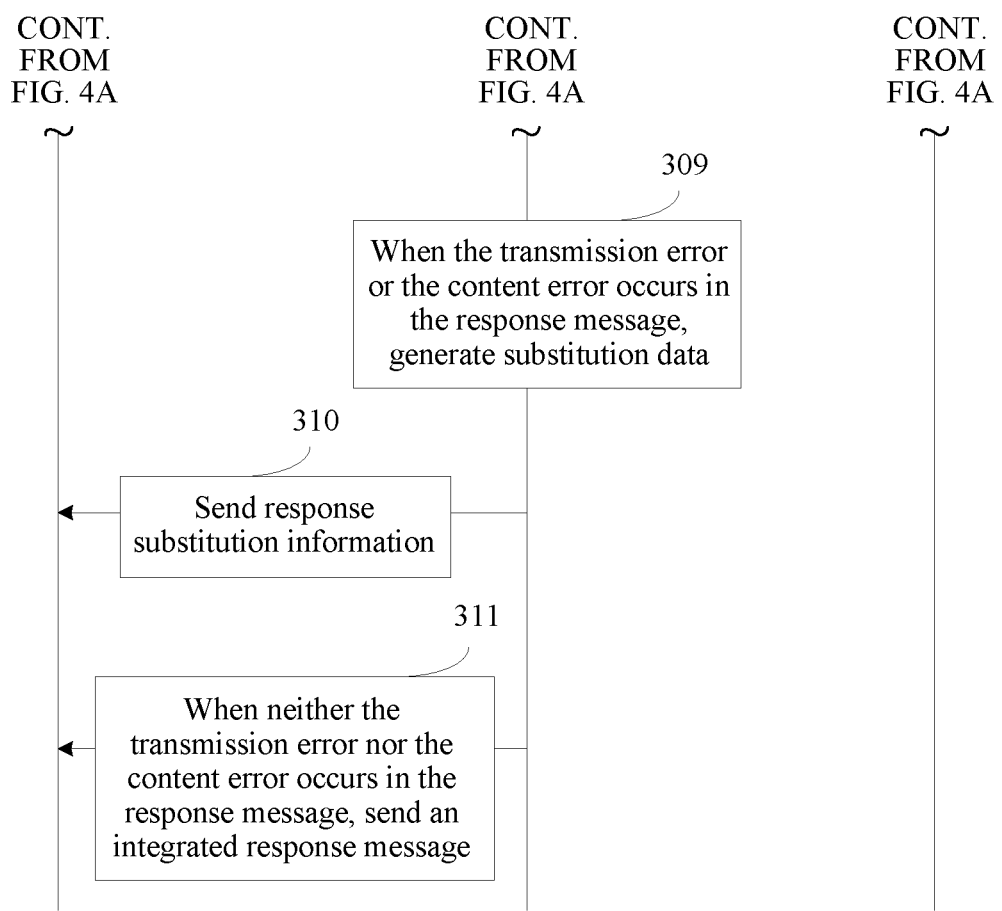

An embodiment of the present invention provides still another response message processing method. The method may be applied to the response message processing system 00 shown in FIG. 1. As shown in FIG. 4A and FIG. 4B, the method includes the following steps.

Step 301: A request device sends a device ID to a CSE.

The request device first sends a list query request to the CSE, and then the CSE returns a device ID list to the request device. Then the request device selects a destination device ID from the ID list, and sends the device ID to the CSE. For example, it is assumed that the request device may be a mobile phone outside a room. The mobile phone wants to obtain a temperature inside the room. It is known that there is a temperature sensor and a humidity sensor in the room. A device ID of the temperature sensor is ID 1, and a device ID of the humidity sensor is ID 2. The CSE stores a device ID list including the ID 1 and ID 2. The mobile phone first sends a list query request to the CSE, the CSE returns the device ID list of the temperature sensor and the humidity sensor to the mobile phone, and then the mobile phone selects the device ID, that is, the ID 1 of the temperature sensor from the device ID list, and sends the ID 1 to the CSE.

Step 302: The CSE sends, according to the device ID, a query request to a destination device corresponding to the device ID.

The CSE stores the device ID list. Therefore, when the CSE receives the device ID sent by the request device, the CSE may find, from the device ID list according to the device ID, the destination device corresponding to the device ID, and then send the query request to the destination device.

Step 303: The destination device sends a response message to the CSE.

After receiving the query request sent by the CSE, the destination device returns the response message to the CSE, to respond to the query request sent by the CSE.

Step 304: The CSE determines whether a transmission error occurs in the response message. When no transmission error occurs in the response message, step 305 is performed; or when a transmission error occurs in the response message, step 309 is performed.

Errors of the response message may include a transmission error and a content error. The transmission error may be that the CSE does not receive the response message in a preset time period starting from a moment of sending the query request, or that content of the received response message is null. The content error may be that data resource in the response message does not conform to a preset rule.

In an M2M system, if the CSE does not receive the response message in the preset time period starting from the moment of sending the query request, or if the CSE receives the response message in the preset time period starting from the moment of sending the query request, but the content of the response message is null, the CSE considers that the transmission error occurs in the response message.

Figure 5:
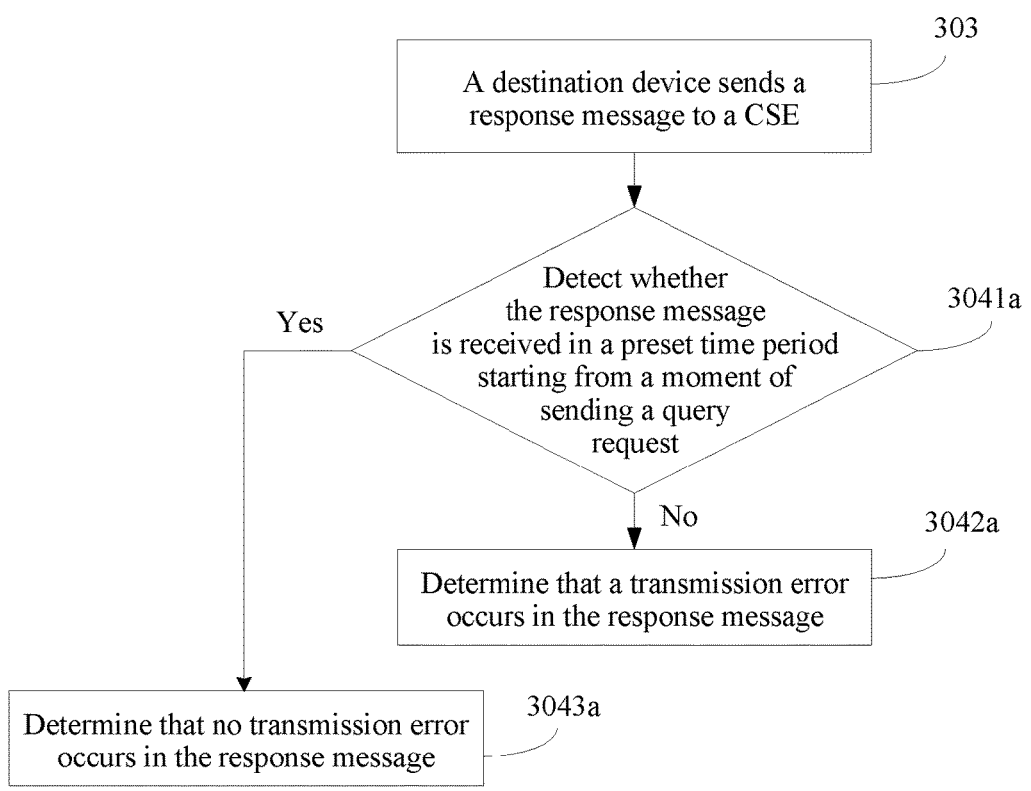
FIG. 5 is a flowchart of a method for determining, by a CSE, whether a transmission error occurs in a response message according to an embodiment of the present invention.

On one hand, as shown in FIG. 5, that the CSE determines whether a transmission error occurs in the response message may specifically include the following steps.

Step 3041*a*: Detect whether the response message is received in a preset time period starting from a moment of sending the query request, and when the response message is not received in the preset time period starting from the moment of sending the query request, perform step 3042*a*; or when the response message is received in the preset time period starting from the moment of sending the query request, perform step 3043*a*.

In order that the CSE can determine whether the transmission error occurs in the response message, a countdown module may be disposed in the CSE. In step 302, when the CSE sends, according to the device ID, the query request to the destination device corresponding to the device ID, the countdown module performs countdown based on duration of the preset time period starting from the moment of sending the query request.

Step 3042*a*: Determine that the transmission error occurs in the response message.

For example, a moment is 11:00 when the CSE sends, according to the device ID, the query request to the destination device corresponding to the device ID, and the duration of the preset time period is 15 seconds. When the CSE detects that the response message is not received at 15 seconds past 11, the CSE may determine that the transmission error occurs in the response message.

Step 3043*a*: Determine that no transmission error occurs in the response message.

For example, a moment is 11:00 when the CSE sends, according to the device ID, the query request to the destination device corresponding to the device ID, and the preset time period is 15 seconds. When the CSE detects that the response message is received at 15 seconds past 11, the CSE may determine that no transmission error occurs in the response message.

Figure 6:
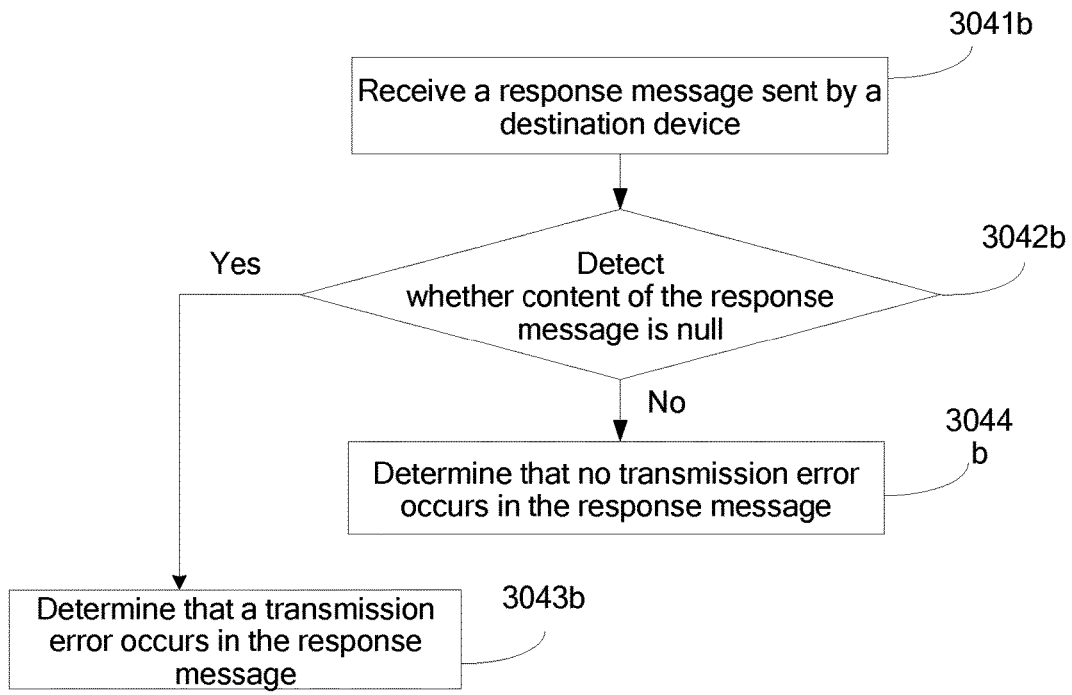
FIG. 6 is a flowchart of another method for determining, by a CSE, whether a transmission error occurs in a response message according to an embodiment of the present invention.

On another hand, as shown in FIG. 6, that the CSE determines whether a transmission error occurs in the response message may further specifically include the following steps.

Step 3041*b*: Receive the response message sent by the destination device.

Step 3042*b*: Detect whether content of the response message is null, and when the content of the response message is null, perform step 3043*b*, or when the content of the response message is not null, perform step 3044*b*.

That the content of the response message is null indicates that the CSE receives the response message in the preset time period starting from the moment of sending the query request, but the content of the response message is null.

Step 3043*b*: Determine that the transmission error occurs in the response message.

For example, a moment is 11:00 when the CSE sends, according to the device ID, the query request to the destination device corresponding to the device ID, and the preset time period is 15 seconds. When the CSE detects that the response message is received at 15 seconds past 11, but the content of the response message is null, the CSE may determine that the transmission error occurs in the response message.

Step 3044*b*: Determine that no transmission error occurs in the response message.

For example, a moment is 11:00 when the CSE sends, according to the device ID, the query request to the destination device corresponding to the device ID, and the preset time period is 15 seconds. When the CSE detects that the response message is received at 15 seconds past 11, and the content of the response message is not null, the CSE may determine that no transmission error occurs in the response message.

In actual application, when it is detected that the response message is received in the preset time period starting from the moment of sending the query request in step 3041*a*, step 3042*b* may also be directly performed. When the content of the response message is not null, it is then determined that no transmission error occurs in the response message.

Step 305: When no transmission error occurs in the response message, the CSE sends the response message to the request device. Step 306 is performed.

For example, when the CSE receives the response message in the preset time period starting from the moment of sending the query request, and the content of the response message is not null, the CSE sends the response message to the request device.

Step 306: The request device determines whether a content error occurs in the response message. When the content error occurs in the response message, step 307 is performed; or when no content error occurs in the response message, step 311 is performed.

Figure 7:
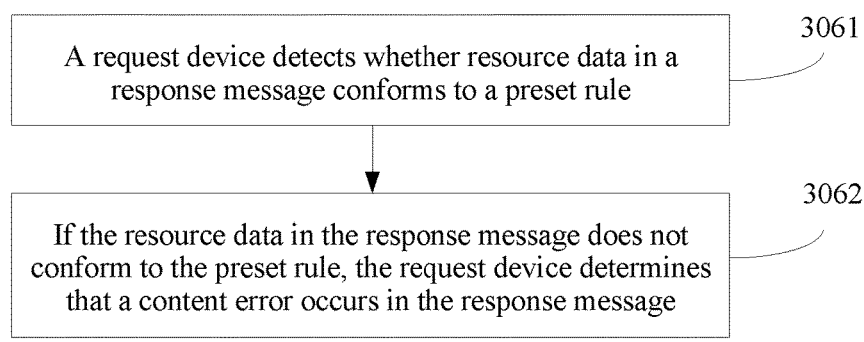
FIG. 7 is a flowchart of a method for determining, by a request device, whether a content error occurs in a response message according to an embodiment of the present invention.

As shown in FIG. 7, that the request device determines whether a content error occurs in the response message may specifically include the following steps:

Step 3061: The request device detects whether resource data in the response message conforms to a preset rule.

The preset rule is preconfigured in the request device according to a specific application scenario of an M2M technology. For example, when the request device wants to obtain a temperature inside a room, the preset rule may be a combination of a value and a unit, the value is within a specified range, for example, 0 to 28, and the unit is ° C. (Celsius). Therefore, if a temperature value in the response message is not within the range of 0 to 28, or a unit is not ° C., it may be determined that the resource data in the response message does not conform to the preset rule; or if a temperature value in the response message is within the range of 0 to 28, and a unit is ° C., it may be determined that the resource data in the response message conforms to the preset rule.

Step 3062: If the resource data in the response message does not conform to the preset rule, the request device determines that the content error occurs in the response message.

For example, the request device is a mobile phone outside a room. The mobile phone wants to obtain a temperature inside the room. A temperature sensor is disposed in the room. The temperature sensor sends a response message to the CSE according to the query request sent by the CSE. If resource data in the response message is 26° C., and conforms to the preset rule, that is, if the data is within a specified range and the unit is ° C., the request device determines that no content error occurs in the response message. If resource data in the response message is 102##, and does not conform to the preset rule, the request device determines that the content error occurs in the response message.

Step 307: When the content error occurs in the response message, the request device generates a re-retrieval message. Step 308 is performed.

The re-retrieval message is used to indicate that the content error occurs in the response message. When the request device determines that the content error occurs in the response message, the request device generates a re-retrieval message, to indicate that the content error occurs in the response message.

Step 308: The request device sends the re-retrieval message to the CSE. Step 309 is performed.

When the request device determines that the content error occurs in the response message, the request device generates a re-retrieval message and sends the re-retrieval message to the CSE.

Step 309: When the transmission error or the content error occurs in the response message, the CSE generates substitution data. Step 310 is performed.

The substitution data is associated with resource data requested by the query request and is used to substitute for the resource data requested by the query request. Generally, the substitution data is approximately equal to the resource data requested by the query request.

For example, the destination device is a temperature sensor. A response message returned by the temperature sensor to the CSE according to the query request sent by the CSE is 102##. It may be learned that the content error occurs in the response message. The CSE generates substitution data associated with the resource data requested by the query request, and the substitution data conforms to the preset rule.

Figure 8:
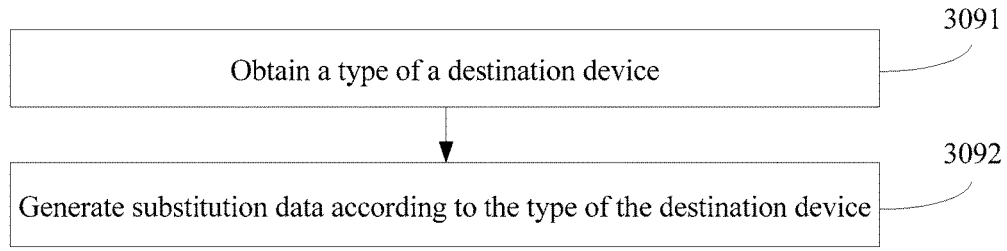
FIG. 8 is a flowchart of a method for generating substitution data by a CSE according to an embodiment of the present invention.

As shown in FIG. 8, that the CSE generates substitution data may specifically include:

Step 3091: Obtain a type of the destination device.

For example, the type of the destination device may be a sensing type, and a device of the sensing type is configured to sense a preset attribute in preset space, for example, a temperature sensor in a conference room. Alternatively, the type of the destination device may be a steady output type, and an absolute value of a difference between pieces of resource data that are of a device of the steady output type and that are at adjacent moments is smaller than a preset value, for example, a water level detector of a river bed. Alternatively, the type of the destination device may be a predictable output type, and there is a preset function relationship between pieces of resource data that are of a device of the predictable output type and that are at adjacent moments, for example, an in-vehicle Global Positioning System (GPS).

Step 3092: Generate the substitution data according to the type of the destination device.

It should be noted that when the transmission error or the content error occurs in the response message returned by the destination device, in order that the CSE can perform analysis and formulate an alternative solution flexibly and quickly, to substitute for a response message in which an error occurs and feed back valid resource data in a timely manner, an alternative response module (Alternative Function) is disposed in the CSE in this embodiment of the present invention, so as to generate the substitution data quickly. The alternative response module mainly generates the substitution data when an error occurs in resource data obtained by the request device, so that the CSE can make a quick and accurate response to the request device.

When the transmission error or the content error occurs in the response message returned by the destination device, the CSE sends the destination device ID to the alternative response module and triggers the alternative response module. The alternative response module obtains the type of the destination device based on the destination device ID, executes different substitute response functions according to the type of the destination device, queries resource data required for obtaining a function by the CSE, and finally returns, to the CSE, a processing result that is of the resource data and that is in a form of the substitution data.

In a first aspect, the type of the destination device may be the sensing type, and the device of the sensing type is configured to sense the preset attribute in the preset space.

Step 3092 may include: obtaining resource data that is of a sensing device of a same type as the destination device and that is located in the preset space; and generating the substitution data according to the resource data.

The generating the substitution data according to the resource data may include: if there are multiple pieces of resource data, obtaining an average value of the multiple pieces of resource data and using the average value as the substitution data; or if there is one piece of resource data, using the one piece of resource data as the substitution data.

For example, a type of the temperature sensor in the conference room is the sensing type, and the temperature sensor is configured to sense a temperature attribute in the conference room. When the alternative response module learns, based on a device ID of a temperature sensor A, that a type of the temperature sensor A is the sensing type, temperature data of a surrounding temperature sensor of the temperature sensor A in the conference room may be obtained. If there are multiple surrounding temperature sensors, that is, there are multiple pieces of temperature data, an average value of the multiple pieces of temperature data may be obtained and used as the substitution data. If there is one surrounding temperature sensor, that is, there is one piece of temperature data, the temperature data may be used as the substitution data.

In a second aspect, the type of the destination device may be the steady output type, and the absolute value of the difference between the pieces of resource data that are of the device of the steady output type and that are at adjacent moments is smaller than the preset value.

Step 3092 may include: obtaining resource data of the destination device at a previous moment and using the resource data as the substitution data.

An absolute value of a difference between pieces of resource data that are of a destination device of this type and that are at a t+1 moment and a t moment is smaller than a preset value E, that is, |Data (t+1)−Data (t)|<ε. It may be approximately considered that Data (t+1)=Data (t)±ε. If the preset value E is relatively small, it may be considered by default that Data (t+1)=Data (t).

For example, a type of the water level detector of the river bed is the steady output type. When the alternative response module learns, based on a device ID of a water level detector B, that a type of the water level detector B is the steady output type, water level data of the water level detector B at a previous moment may be used as substitution data at a current moment.

In a third aspect, the type of the destination device may be the predictable output type, and there is a preset function relationship between the pieces of resource data that are of the device of the predictable output type and that are at adjacent moments.

Step 3092 may include: obtaining resource data of the destination device at a previous moment; obtaining a correlation function of the destination device, where the correlation function is used to indicate a preset function relationship between the resource data at the previous moment and resource data at a current moment; and performing calculation according to the resource data at the previous moment and the correlation function, to obtain the substitution data.

There is a function relationship of a correlation between pieces of resource data output by a destination device of this type at all moments, that is, Data (t+1)=Func (Data (t)). Therefore, resource data of the destination device of this type at a previous moment and a correlation function of the destination device may be obtained. There are many manners for obtaining the correlation function. The correlation function may be obtained by analyzing historical resource data of the destination device of this type by the CSE, or may be obtained by means of machine learning.

For example, a type of the in-vehicle GPS is the predictable output type. When the alternative response module learns, based on a device ID of the in-vehicle GPS, that a type of the in-vehicle GPS is the predictable output type, the substitution data may be obtained by means of calculation according to location data of the in-vehicle GPS at a previous moment and a correlation function. It is assumed that a location at a t moment is Data (t)=<Lo(t), La(t), Al(t)>, where Lo(t) indicates a location of a vehicle running at the t moment, La(t) indicates a speed of the vehicle running at the t moment, and Al(t) indicates acceleration of the vehicle running at the t moment. Because there is a relationship between a location at a t+1 moment and the location, the speed and the acceleration at the t moment, the location at the t+1 moment may be obtained according to the location at the t moment and a running distance in a time period $\Delta(t)$ at speed $\overline{v(t)}$ at the t moment. That is, the location at the t+1 moment may be expressed as:

$$\text{Data}(t+1)=<Lo(t),La(t),Al(t)>=\text{Data}(t)+\overline{v(t)}*\Delta(t)$$

Step 310: The CSE sends response substitution information to the request device.

The response substitution information includes the substitution data and the device ID. For a generation process of the substitution data, refer to step 309.

Step 311: When neither the transmission error nor the content error occurs in the response message, the CSE sends an integrated response message to the request device.

When neither the transmission error nor the content error occurs in the response message returned by the destination device, the CSE sends the integrated response message to the request device. The integrated response message includes data in an original response message and the device ID.

It should be noted that to distinguish whether the request device receives the integrated response message or the response substitution information, content of the response message may be extended. Specifically, as shown in Table 1, Tdata in Table 1 represents data in the original response message; Vdata represents data in a response message processed by the alternative response module, that is, the substitution data; a device ID represents a device identifier; and SIGN represents an information substitution identifier that indicates whether the response message is processed by the alternative response module. When SIGN is 0, it indicates that the response message is not processed by the alternative response module, that is, the request device receives the integrated response message, and in this case, the integrated response message carries the Tdata. When SIGN is 1, it indicates that the response message is processed by the alternative response module, that is, the request device receives the response substitution information, and in this case, the response substitution information carries the Vdata.

TABLE 1

| Tdata or Vdata | Device ID | SIGN |
| --- | --- | --- |

According to the response message processing method provided in this embodiment of the present invention, the information substitution identifier may indicate whether the resource data requested by the query request is substituted. Therefore, after receiving the integrated response message or the response substitution information, the request device may detect whether the information substitution identifier is 0 or 1, so as to determine, according to a detection result, whether the resource data requested by the query request is substituted; and may further choose whether to receive the integrated response message or response substitution information sent by the CSE.

For example, when neither the transmission error nor the content error occurs in the response message, the CSE adds a destination device ID to the response message, enables SIGN=0, and finally sends the integrated response message to the request device. When the transmission error or the content error occurs in the response message returned by the destination device, the CSE triggers the alternative response module in the CSE, and sends the destination device ID to the alternative response module. The CSE exchanges alternative data with the alternative response module, obtains the substitution data Vdata, and returns the substitution data Vdata to the CSE. After receiving the Vdata, the CSE adds the destination device ID to the Vdata, to form the response substitution information, enables SIGN=1 at the same time, and finally sends the response substitution information to the request device.

Figure 9:
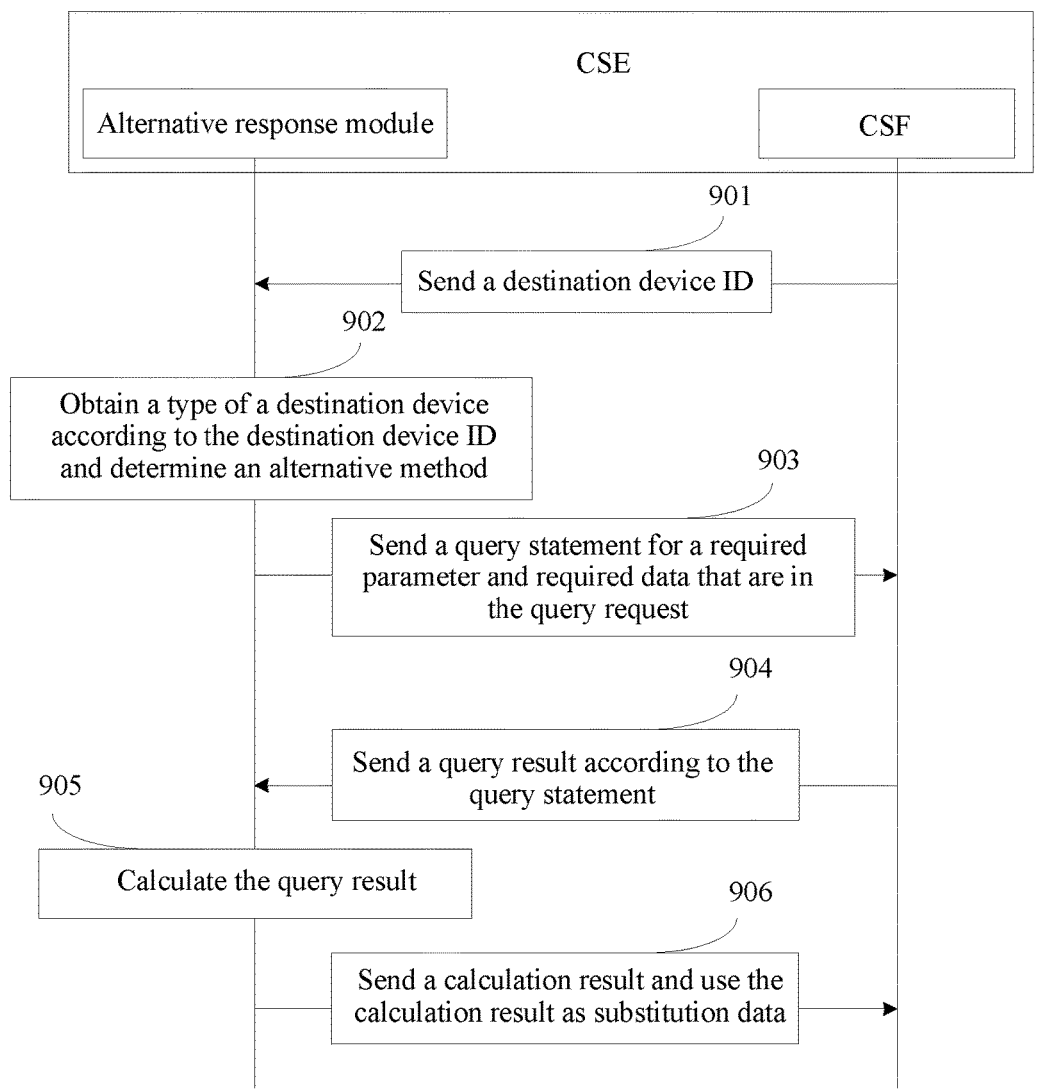
FIG. 9 is a flowchart of a process of interaction between an alternative response module and a CSF module according to an embodiment of the present invention.

It should be noted that besides the alternative response module configured to generate the substitution data, a CSF module configured to communicate with the request device and the destination device may also be disposed in the CSE. As shown in FIG. 9, a specific process of interaction between the alternative response module and the CSF module may be as follows:

Step 901: The CSF module sends a destination device ID to the alternative response module.

Step 902: The alternative response module obtains the type of the destination device according to the destination device ID, to determine an alternative method.

Step 903: The alternative response module sends, to the CSF module, a query statement for a required parameter and required data that are in the query request.

Step 904: The CSF module sends a query result to the alternative response module according to the query statement.

Step 905: The alternative response module calculates the query result.

Step 906: The alternative response module sends a calculation result to the CSF module and uses the calculation result as the substitution data.

To further describe a specific process of the response message processing method provided in this embodiment of the present invention, a temperature sensor in a smart conference room and a water level detector of a river bed on a river are separately described as an example.

In the smart conference room, to sense an indoor temperature condition, multiple temperature sensors are usually deployed indoors, and a client (the request device) automatically adjusts an indoor temperature by querying a temperature of each temperature sensor in real time. The CSE sends, according to a device ID sent by the client (the request device), a query request to a temperature sensor D1 (the destination device) corresponding to the device ID. When the temperature sensor D1 (the destination device) fails because of a fault, and the CSE does not receive a response message returned by the temperature sensor D1 in a preset time period starting from a moment of sending the query request, the CSE needs to trigger the alternative response module to generate substitution data. A type of the temperature sensor in the smart conference room is the sensing type. Therefore, to generate the substitution data, a temperature of a surrounding temperature sensor of the temperature sensor D1 in the smart conference room may be first obtained. When there are multiple surrounding temperature sensors, an average value of temperatures corresponding to the temperature sensors is used as the substitution data. When there is one surrounding temperature sensor, a temperature corresponding to the temperature sensor is used as the substitution data. A quantity of temperature sensors herein is greater than 2.

Figure 10:
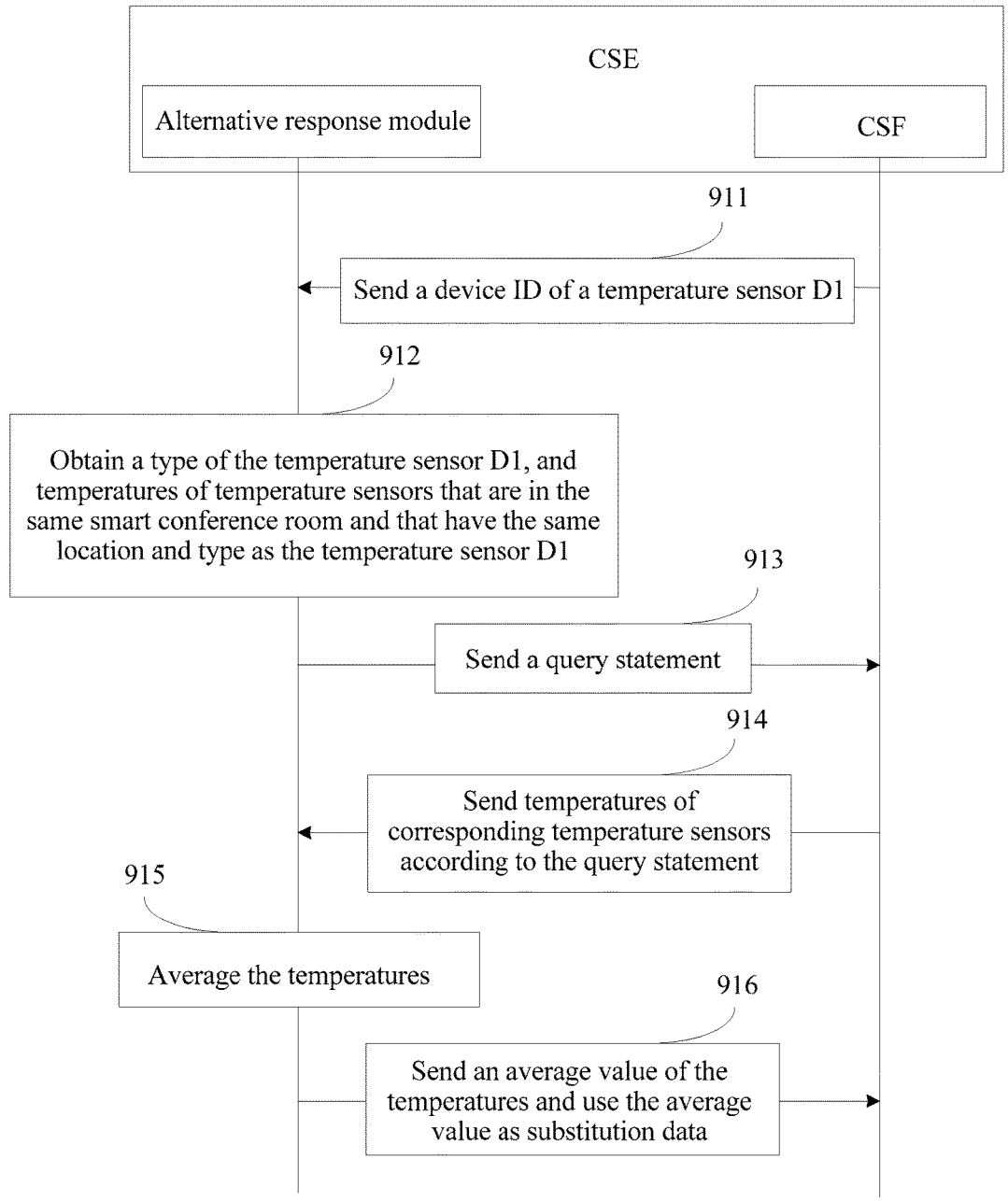
FIG. 10 is another flowchart of a process of interaction between an alternative response module and a CSF module according to an embodiment of the present invention.

As shown in FIG. 10, a process of interaction between the alternative response module and the CSF module in the CSE may be as follows:

Step 911: The CSF module sends a device ID of a temperature sensor D1 to the alternative response module.

Step 912: The alternative response module obtains a type of the temperature sensor D1, and temperatures of temperature sensors that are in the same smart conference room and that have the same location and type as the temperature sensor D1.

Step 913: The alternative response module sends a query statement to the CSF module. Specific query statements are as follows:

Select Machine.temperature as Temperature_Set // instructs to query temperatures of temperature sensors;

From Machine_set // instructs to query the temperatures of the temperature sensors from a Machine_set database; and Where Machine_set.location=D1.location and Machine_set.type=D1.type // indicates a condition for returning, that is, the temperatures of the temperature sensors that have the same location and type as the temperature sensor D1 are returned.

Step 914: The CSF module sends temperatures of corresponding temperature sensors to the alternative response module according to the query statement.

Step 915: The alternative response module averages the temperatures.

Step 916: The alternative response module sends an average value of the temperatures to the CSF module and uses the average value as the substitution data.

Further, to pay real-time attention to a rise status of the river, a water level detector is usually deployed on the river bed. The CSE sends a query request to a water level detector D1 (the destination device) according to a device ID sent by a client (the request device). When a fault occurs in a network interface and content of response data returned by the water detector D1 is null, the CSE needs to trigger the alternative response module to generate substitution data. Rise of the river does not change greatly in a short period, and a type of the water detector D1 is the steady output type. Therefore, water level data of the water level detector D1 at a previous moment may be obtained and used as substitution data at a current moment.

Figure 11:
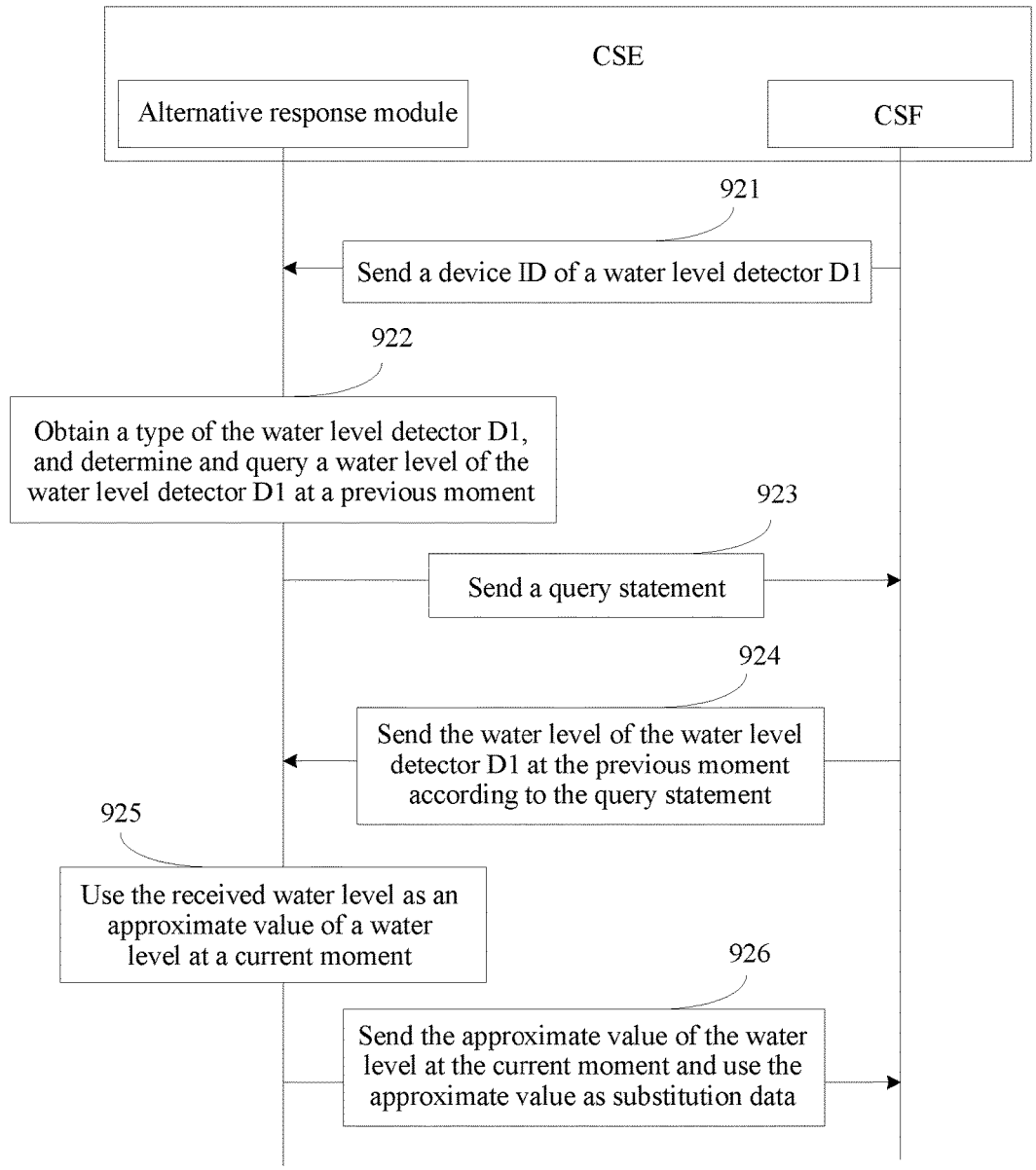
FIG. 11 is still another flowchart of a process of interaction between an alternative response module and a CSF module according to an embodiment of the present invention.

As shown in FIG. 11, a process of interaction between the alternative response module and the CSF module in the CSE may be as follows:

Step 921: The CSF module sends a device ID of a water level detector D1 to the alternative response module.

Step 922: The alternative response module obtains a type of the water level detector D1, and determines and queries a water level of the water level detector D1 at a previous moment.

Step 923: The alternative response module sends a query statement to the CSF module. Specific query statements are as follows:

Select D1.data(t−1) // instructs to query the water level of the water level detector D1 at the previous moment;

From Machine_set.data(t−1) // instructs to query the water level of the water level detector D1 at the previous moment from Machine_set.data; and Where Machine_set.URI=D1.URI // indicates a condition for returning; that is, the water level of the water level detector D1 at the previous moment is found from Machine_set.data, and the water level at the previous moment is used as a water level at a current moment.

Step 924: The CSF module sends the water level of the water level detector D1 at the previous moment to the alternative response module according to the query statement.

Step 925: The alternative response module uses the received water level as an approximate value of a water level at a current moment.

Step 926: The alternative response module sends the approximate value of the water level at the current moment to the CSF module and uses the approximate value as the substitution data.

It should be noted that a sequence of the steps of the response message processing method provided in this embodiment of the present invention may be adjusted properly, and steps may also be added or removed according to conditions. Any modified methods readily figured out by persons skilled in the art within the technical scope disclosed in the present invention shall fall within the protection scope of the present invention, and therefore, details are not described again.

In the response message processing method provided in this embodiment of the present invention, a CSE sends, according to a device ID sent by a request device, a query request to a corresponding destination device; and when an error occurs in a response message returned by the destination device according to the query request, the CSE may generate substitution data, to substitute for resource data requested by the query request, and send response substitution information to the request device according to the substitution data, so that the request device obtains valid data. Therefore, reliability of an M2M system is improved.

Figure 12:
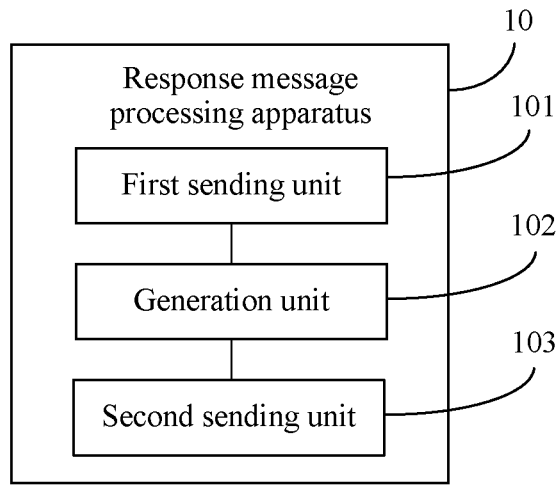
FIG. 12 is a schematic structural diagram of a response message processing apparatus according to an embodiment of the present invention.

An embodiment of the present invention provides a response message processing apparatus 10, and the response message processing apparatus 10 is applied to a CSE. As shown in FIG. 12, the response message processing apparatus 10 includes:

a first sending unit 101, a generation unit 102, and a second sending unit 103.

The first sending unit 101 is configured to send, according to a device identifier sent by a request device, a query request to a destination device corresponding to the device identifier, so that the destination device returns a response message according to the query request.

The generation unit 102 is configured to generate substitution data when an error occurs in the response message, where the substitution data is associated with resource data requested by the query request and is used to substitute for the resource data requested by the query request.

The second sending unit 103 is configured to send response substitution information to the request device, where the response substitution information includes the substitution data and the device identifier.

According to the response message processing apparatus provided in this embodiment of the present invention, a first sending unit sends, according to a device ID sent by a request device, a query request to a corresponding destination device; when an error occurs in a response message returned by the destination device according to the query request, the generation unit may generate substitution data, to substitute for resource data requested by the query request; and a second sending unit sends response substitution information to the request device according to the substitution data, so that the request device obtains valid data. Therefore, reliability of an M2M system is improved.

Figure 13:
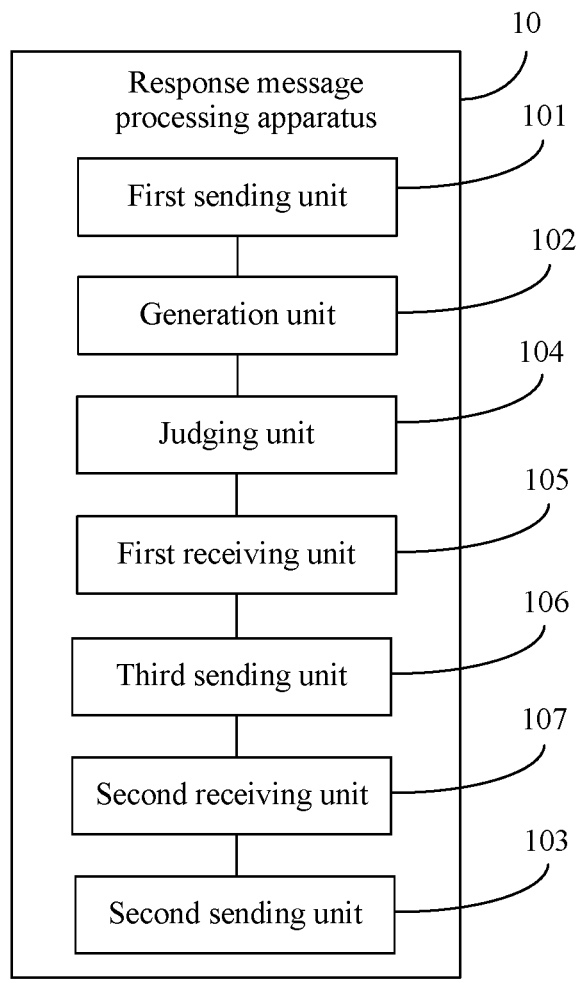
FIG. 13 is a schematic structural diagram of another response message processing apparatus according to an embodiment of the present invention.

An embodiment of the present invention provides another response message processing apparatus 10, and the response message processing apparatus 10 is applied to a CSE. As shown in FIG. 13, the response message processing apparatus 10 includes:

a first sending unit 101, a generation unit 102, a second sending unit 103, a judging unit 104, a first receiving unit 105, a third sending unit 106, and a second receiving unit 107.

The first sending unit 101 is configured to send, according to a device identifier sent by a request device, a query request to a destination device corresponding to the device identifier, so that the destination device returns a response message according to the query request.

The generation unit 102 is configured to generate substitution data when an error occurs in the response message, where the substitution data is associated with resource data requested by the query request and is used to substitute for the resource data requested by the query request.

The second sending unit 103 is configured to send response substitution information to the request device, where the response substitution information includes the substitution data and the device identifier.

The judging unit 104 is configured to determine whether a transmission error occurs in the response message.

The first receiving unit 105 is configured to receive the response message sent by the destination device.

The third sending unit 106 is configured to send the response message to the request device, so that the request device determines whether a content error occurs in the response message.

The second receiving unit 107 is configured to receive a re-retrieval message sent by the request device, where the re-retrieval message is generated when the request device determines that the content error occurs in the response message, and is used to indicate that the content error occurs in the response message.

Figure 14:
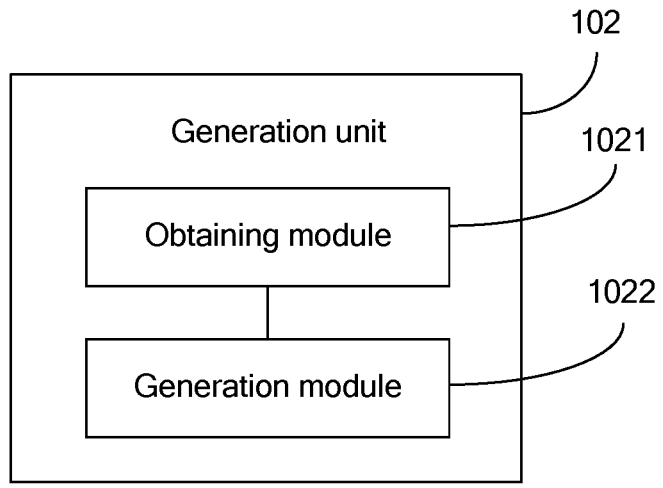
FIG. 14 is a schematic structural diagram of a generation unit of a response message processing apparatus according to an embodiment of the present invention.

As shown in FIG. 14, the generation unit 102 may include:

an obtaining module 1021 and a generation module 1022.

The obtaining module 1021 is configured to obtain a type of the destination device.

The generation module 1022 is configured to generate the substitution data according to the type of the destination device.

Figure 15:
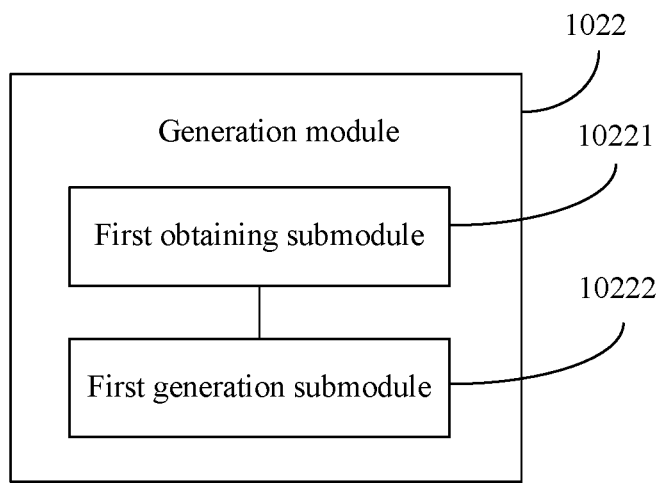
FIG. 15 is a schematic structural diagram of a generation module of a response message processing apparatus according to an embodiment of the present invention.

The type of the destination device may be a sensing type, and a device of the sensing type is configured to sense a preset attribute in preset space. Correspondingly, as shown in FIG. 15, the generation module 1022 may include:

a first obtaining submodule 10221 and a first generation submodule 10222.

The first obtaining submodule 10221 is configured to obtain resource data that is of a sensing device of a same type as the destination device and that is located in the preset space.

The first generation submodule 10222 is configured to generate the substitution data according to the resource data.

Specifically, the first generation submodule 10222 is specifically configured to:

if there are multiple pieces of resource data, obtain an average value of the multiple pieces of resource data and use the average value as the substitution data; or if there is one piece of resource data, use the one piece of resource data as the substitution data.

Figure 16:
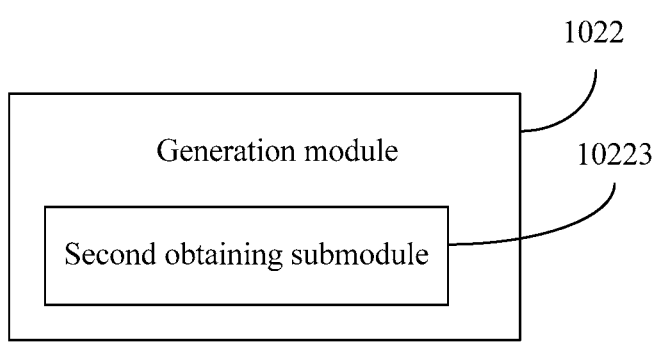
FIG. 16 is a schematic structural diagram of another generation module of a response message processing apparatus according to an embodiment of the present invention.

The type of the destination device may be a steady output type, and an absolute value of a difference between pieces of resource data that are of a device of the steady output type and that are at adjacent moments is smaller than a preset value. Correspondingly, as shown in FIG. 16, the generation module 1022 may include:

a second obtaining submodule 10223, configured to obtain resource data of the destination device at a previous moment and use the resource data as the substitution data.

Figure 17:
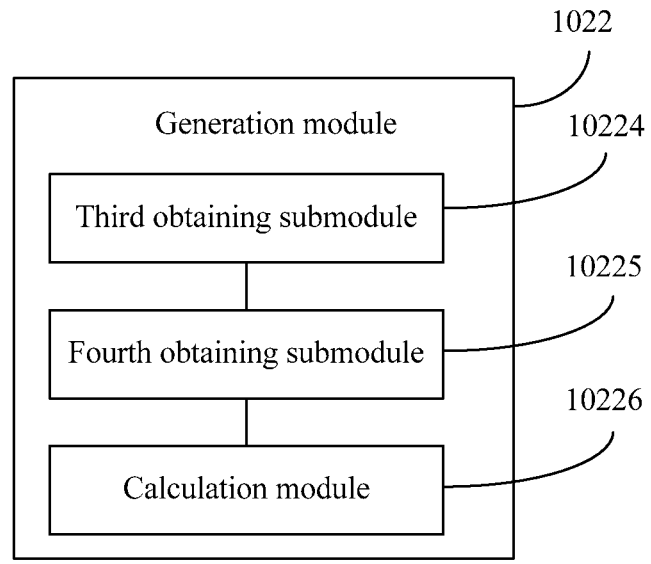
FIG. 17 is a schematic structural diagram of still another generation module of a response message processing apparatus according to an embodiment of the present invention.

The type of the destination device may be a predictable output type, and there is a preset function relationship between pieces of resource data that are of a device of the predictable output type and that are at adjacent moments. Correspondingly, as shown in FIG. 17, the generation module 1022 may include:

a third obtaining submodule 10224, a fourth obtaining module 10225, and a calculation module 10226.

The third obtaining submodule 10224 is configured to obtain resource data of the destination device at a previous moment.

The fourth obtaining submodule 10225 is configured to obtain a correlation function of the destination device, where the correlation function is used to indicate a preset function relationship between the resource data at the previous moment and resource data at a current moment.

The calculation module 10226 is configured to perform calculation according to the resource data at the previous moment and the correlation function, to obtain the substitution data.

Figure 18:
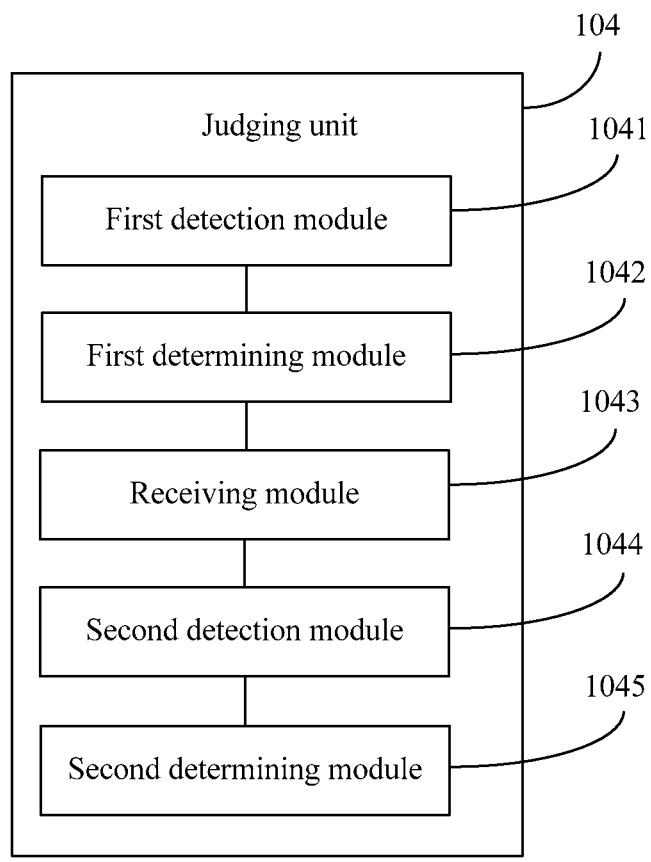
FIG. 18 is a schematic structural diagram of a judging unit of a response message processing apparatus according to an embodiment of the present invention.

Further, as shown in FIG. 18, the judging unit 104 may include:

a first detection module 1041, a first determining module 1042, a receiving module 1043, a second detection module 1044, and a second determining module 1045.

The first detection module 1041 is configured to detect whether the response message is received in a preset time period starting from a moment of sending the query request.

The first determining module 1042 is configured to: when the response message is not received, determine that the transmission error occurs in the response message.

The receiving module 1043 is configured to receive the response message sent by the destination device.

The second detection module 1044 is configured to detect whether content of the response message is null.

The second determining module 1045 is configured to: when the content of the response message is null, determine that the transmission error occurs in the response message.

It should be noted that the response substitution information further includes an information substitution identifier, and the information substitution identifier is used to indicate whether the resource data requested by the query request is substituted.

According to the response message processing apparatus provided in this embodiment of the present invention, a first sending unit sends, according to a device ID sent by a request device, a query request to a corresponding destination device; when an error occurs in a response message returned by the destination device according to the query request, the generation unit may generate substitution data, to substitute for resource data requested by the query request; and a second sending unit sends response substitution information to the request device according to the substitution data, so that the request device obtains valid data. Therefore, reliability of an M2M system is improved.

Figure 19:
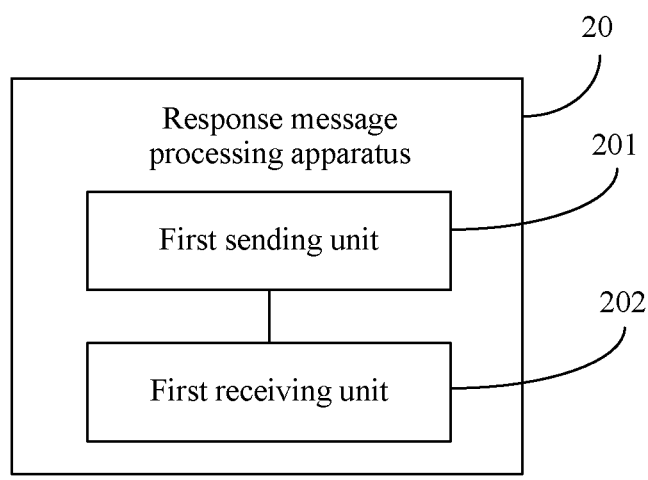
FIG. 19 is a schematic structural diagram of still another response message processing apparatus according to an embodiment of the present invention.

An embodiment of the present invention provides still another response message processing apparatus 20, and the response message processing apparatus 20 is applied to a request device. As shown in FIG. 19, the response message processing apparatus 20 includes:

a first sending unit 201 and a first receiving unit 202.

The first sending unit 201 is configured to send a device identifier to a CSE, so that the CSE sends, according to the device identifier, a query request to a destination device corresponding to the device identifier.

The first receiving unit 202 is configured to receive response substitution information sent by the CSE, where the response substitution information is generated by the CSE when an error occurs in a response message sent by the destination device, substitution data is associated with resource data requested by the query request and is used to substitute for the resource data requested by the query request, and the response substitution information includes the substitution data and the device identifier.

According to the response message processing apparatus provided in this embodiment of the present invention, a first sending unit sends a device identifier to a CSE, so that the CSE sends, according to the device identifier, a query request to a destination device corresponding to the device identifier; and a first receiving unit may receive response substitution information sent by the CSE, to substitute for resource data requested by the query request, so that the request device obtains valid data. Therefore, reliability of an M2M system is improved.

Figure 20:
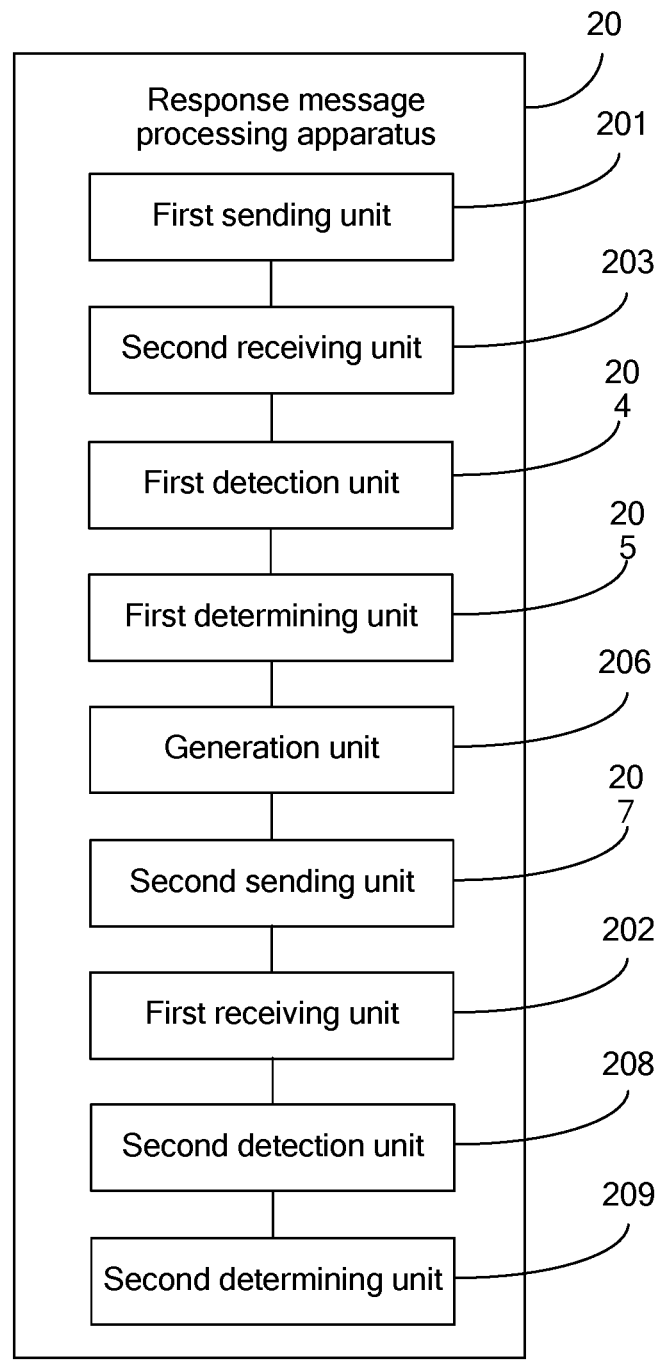
FIG. 20 is a schematic structural diagram of yet another response message processing apparatus according to an embodiment of the present invention.

An embodiment of the present invention provides yet another response message processing apparatus 20, and the response message processing apparatus 20 is applied to a request device. As shown in FIG. 20, the response message processing apparatus 20 includes:

a first sending unit 201, a first receiving unit 202, a second receiving unit 203, a first detection unit 204, a first determining unit 205, a generation unit 206, a second sending unit 207, a second detection unit 208, and a second determining unit 209.

The first sending unit 201 is configured to send a device identifier to a CSE, so that the CSE sends, according to the device identifier, a query request to a destination device corresponding to the device identifier.

The first receiving unit 202 is configured to receive response substitution information sent by the CSE, where the response substitution information is generated by the CSE when an error occurs in a response message sent by the destination device, substitution data is associated with resource data requested by the query request and is used to substitute for the resource data requested by the query request, and the response substitution information includes the substitution data and the device identifier.

The response substitution information further includes an information substitution identifier, and the information substitution identifier is used to indicate whether the resource data requested by the query request is substituted.

The second receiving unit 203 is configured to receive a response message sent by the CSE.

The first detection unit 204 is configured to detect whether resource data in the response message conforms to a preset rule.

The first determining unit 205 is configured to: if the resource data in the response message does not conform to the preset rule, determine that a content error occurs in the response message.

The generation unit 206 is configured to generate a re-retrieval message, where the re-retrieval message is used to indicate that the content error occurs in the response message.

The second sending unit 207 is configured to send the re-retrieval message to the CSE.

The second detection unit 208 is configured to detect the information substitution identifier.

The second determining unit 209 is configured to determine, according to a detection result, whether the resource data requested by the query request is substituted.

According to the response message processing apparatus provided in this embodiment of the present invention, a first sending unit sends a device identifier to a CSE, so that the CSE sends, according to the device identifier, a query request to a destination device corresponding to the device identifier; and a first receiving unit may receive response substitution information sent by the CSE, to substitute for resource data requested by the query request, so that the request device obtains valid data. Therefore, reliability of an M2M system is improved.

An embodiment of the present invention provides a response message processing system, including the response message processing apparatus and the destination device shown in FIG. 12, FIG. 13, FIG. 19, or FIG. 20.

Figure 21:
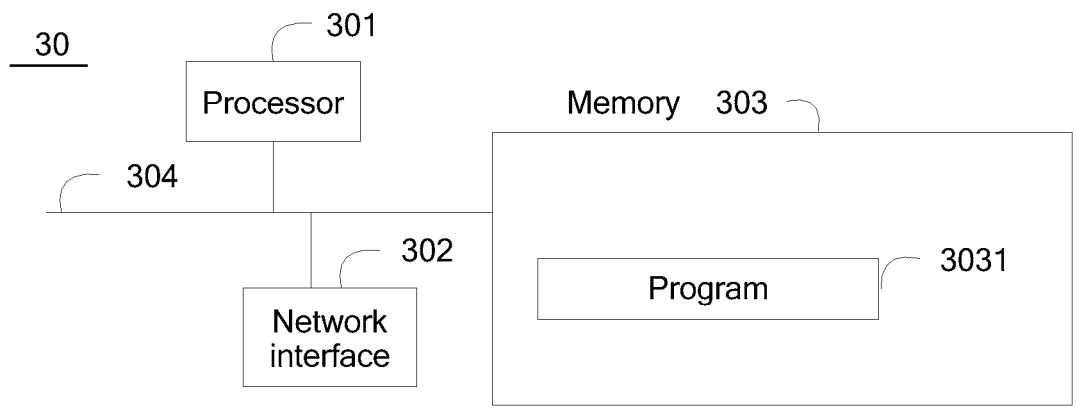
FIG. 21 is a schematic structural diagram of a response message processing apparatus according to another embodiment of the present invention.

Another embodiment of the present invention provides a response message processing apparatus 30, and the response message processing apparatus 30 is applied to a CSE. As shown in FIG. 21, the response message processing apparatus 30 includes: at least one processor 301, at least one network interface 302 or another communications interface, a memory 303, and at least one communications bus 304. For example, the processor 301 may be a central processing unit (CPU), and the communications bus 304 is configured to implement connection and communication between these apparatuses. The processor 301 is configured to execute an executable module, such as a computer program, stored in the memory 303. The memory 303 may include a high-speed random access memory (RAM), and may also include a nonvolatile memory (non-volatile memory), for example, at least one magnetic disk memory. A connection between the CSE and each of a request device and a destination device is implemented by using at least one network interface 302.

In some implementations, the memory 303 stores a program 3031, and the program 3031 may be executed by the processor 301. The program 3031 may include:

sending, according to a device identifier sent by the request device, a query request to a destination device corresponding to the device identifier, so that the destination device returns a response message according to the query request; generating substitution data when an error occurs in the response message, where the substitution data is associated with resource data requested by the query request and is used to substitute for the resource data requested by the query request; and sending response substitution information to the request device, where the response substitution information includes the substitution data and the device identifier.

Optionally, the generating substitution data includes: obtaining a type of the destination device; and generating the substitution data according to the type of the destination device.

Optionally, the type of the destination device may be a sensing type, and a device of the sensing type is configured to sense a preset attribute in preset space.

The generating the substitution data according to the type of the destination device includes: obtaining resource data that is of a sensing device of a same type as the destination device and that is located in the preset space; and generating the substitution data according to the resource data.

Optionally, the generating the substitution data according to the resource data includes: if there are multiple pieces of resource data, obtaining an average value of the multiple pieces of resource data and using the average value as the substitution data; or if there is one piece of resource data, using the one piece of resource data as the substitution data.

Optionally, the type of the destination device may be a steady output type, and an absolute value of a difference between pieces of resource data that are of a device of the steady output type and that are at adjacent moments is smaller than a preset value.

The generating the substitution data according to the type of the destination device includes: obtaining resource data of the destination device at a previous moment and using the resource data as the substitution data.

Optionally, the type of the destination device may be a predictable output type, and there is a preset function relationship between pieces of resource data that are of a device of the predictable output type and that are at adjacent moments.

The generating the substitution data according to the type of the destination device includes: obtaining resource data of the destination device at a previous moment; obtaining a correlation function of the destination device, where the correlation function is used to indicate a preset function relationship between the resource data at the previous moment and resource data at a current moment; and performing calculation according to the resource data at the previous moment and the correlation function, to obtain the substitution data.

Optionally, the error in the response message includes a transmission error, and the program further includes: determining whether the transmission error occurs in the response message.

Optionally, the determining whether the transmission error occurs in the response message includes: detecting whether the response message is received in a preset time period starting from a moment of sending the query request; and if the response message is not received, determining that the transmission error occurs in the response message.

Optionally, the determining whether the transmission error occurs in the response message includes: receiving the response message sent by the destination device; detecting whether content of the response message is null; and if the content of the response message is null, determining that the transmission error occurs in the response message.

Optionally, the error in the response message includes a content error, and the program further includes: receiving the response message sent by the destination device; sending the response message to the request device, so that the request device determines whether the content error occurs in the response message; and receiving a re-retrieval message sent by the request device, where the re-retrieval message is generated when the request device determines that the content error occurs in the response message, and is used to indicate that the content error occurs in the response message.

Optionally, the response substitution information further includes an information substitution identifier, and the information substitution identifier is used to indicate whether the resource data requested by the query request is substituted.

According to the response message processing apparatus provided in this embodiment of the present invention, a processor sends, according to a device ID sent by a request device, a query request to a corresponding destination device; when an error occurs in a response message returned by the destination device according to the query request, the processor may generate substitution data, to substitute for resource data requested by the query request, and send response substitution information to the request device according to the substitution data, so that the request device obtains valid data. Therefore, reliability of an M2M system is improved.

Figure 22:
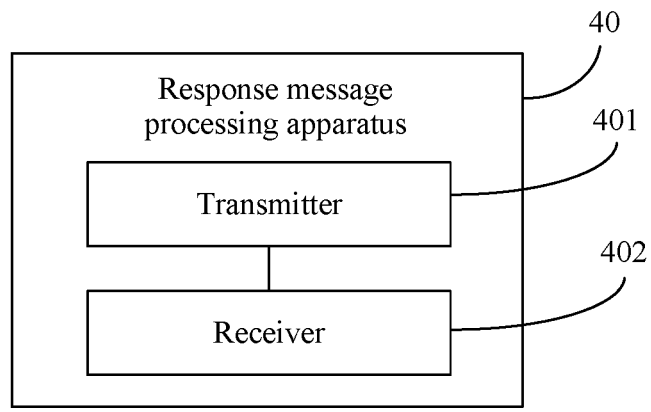
FIG. 22 is a schematic structural diagram of another response message processing apparatus according to another embodiment of the present invention.

Another embodiment of the present invention provides another response message processing apparatus 40, and the response message processing apparatus 40 is applied to a request device. As shown in FIG. 22, the response message processing apparatus 40 includes:

a transmitter 401 and a receiver 402.

The transmitter 401 is configured to send a device identifier to a CSE, so that the CSE sends, according to the device identifier, a query request to a destination device corresponding to the device identifier.

The receiver 402 is configured to receive response substitution information sent by the CSE, where the response substitution information is generated by the CSE when an error occurs in a response message sent by the destination device, substitution data is associated with resource data requested by the query request and is used to substitute for the resource data requested by the query request, and the response substitution information includes the substitution data and the device identifier.

According to the response message processing apparatus provided in this embodiment of the present invention, a transmitter sends a device identifier to a CSE, so that the CSE sends, according to the device identifier, a query request to a destination device corresponding to the device identifier; and a receiver may receive response substitution information sent by the CSE, to substitute for resource data requested by the query request, so that the request device obtains valid data. Therefore, reliability of an M2M system is improved.

Figure 23:
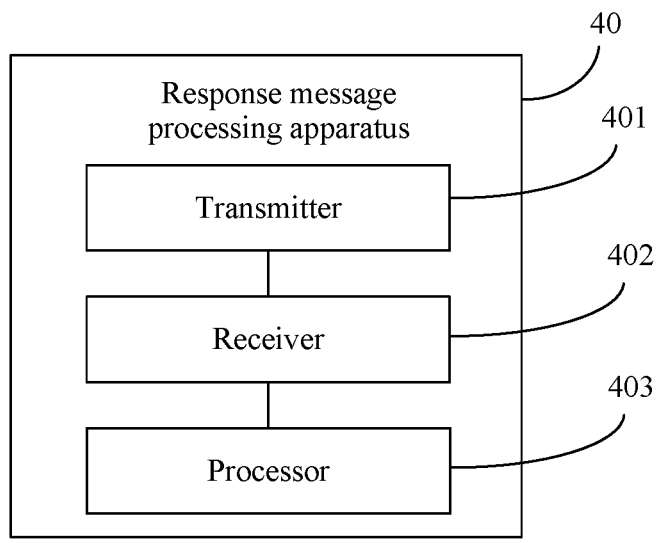
FIG. 23 is a schematic structural diagram of still another response message processing apparatus according to another embodiment of the present invention.

Another embodiment of the present invention provides still another response message processing apparatus 40, and the response message processing apparatus 40 is applied to a request device. As shown in FIG. 23, the response message processing apparatus 40 includes:

a transmitter 401, a receiver 402, and a processor 403.

The transmitter 401 is configured to send a device identifier to a CSE, so that the CSE sends, according to the device identifier, a query request to a destination device corresponding to the device identifier.

The receiver 402 is configured to receive response substitution information sent by the CSE, where the response substitution information is generated by the CSE when an error occurs in a response message sent by the destination device, substitution data is associated with resource data requested by the query request and is used to substitute for the resource data requested by the query request, and the response substitution information includes the substitution data and the device identifier.

The receiver 402 is further configured to receive a response message sent by the CSE.

The processor 403 is configured to detect whether resource data in the response message conforms to a preset rule; if the resource data in the response message does not conform to the preset rule, determine that a content error occurs in the response message; generate a re-retrieval message, where the re-retrieval message is used to indicate that the content error occurs in the response message; and send the re-retrieval message to the CSE.

It should be noted that the response substitution information further includes an information substitution identifier, and the information substitution identifier is used to indicate whether the resource data requested by the query request is substituted. Correspondingly, the processor 403 is further configured to:

detect the information substitution identifier; and determine, according to a detection result, whether the resource data requested by the query request is substituted.

According to the response message processing apparatus provided in this embodiment of the present invention, a transmitter sends a device identifier to a CSE, so that the CSE sends, according to the device identifier, a query request to a destination device corresponding to the device identifier; and a receiver may receive response substitution information sent by the CSE, to substitute for resource data requested by the query request, so that the request device obtains valid data. Therefore, reliability of an M2M system is improved.

Another embodiment of the present invention provides a response message processing system, including the response message processing apparatus and the destination device shown in FIG. 21, FIG. 22, or FIG. 23.

It may be clearly understood by persons skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that the disclosed system, apparatus, and method may be implemented in other manners. For example, the foregoing described apparatus embodiment is merely an example. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The foregoing integrated unit may be implemented in a form of hardware, or may be implemented in a form of hardware in addition to a software functional unit.

The foregoing descriptions are merely examples of embodiments of the present invention, but are not intended to limit the present invention. Any modification, equivalent replacement, and improvement made without departing from the spirit and principle of the present invention shall fall within the protection scope of the present invention. Additionally, statements made herein characterizing the invention refer to an embodiment of the invention and not necessarily all embodiments.

What is claimed is:

1. A response message processing method, comprising:
   sending, by a common service entity (CSE), according to a device identifier sent by a request device, a query request to a destination device corresponding to the device identifier to facilitate the destination device returning a response message according to the query request, wherein the query request is for requesting resource data from the destination device;
   generating, by the CSE, substitution data based on an error relating to the response message, wherein the substitution data is used to substitute for the resource data requested by the query request; and
   sending, by the CSE, response substitution information to the request device, wherein the response substitution information comprises the substitution data and the device identifier;
   wherein the method further comprises:
   detecting whether a response message is received in a preset time period starting from the sending of the query request; and
   in response to a response message not being received in the preset time period, determining that an error relating to the response message has occurred, wherein the error relating to the response message is a transmission error.

2. The method according to claim 1, wherein generating the substitution data comprises:
   obtaining a type of the destination device; and
   generating the substitution data according to the type of the destination device.

3. The method according to claim 2, wherein the type of the destination device is a sensing type, and a device of the sensing type is configured to sense a preset attribute in a preset space; and
   wherein generating the substitution data according to the type of the destination device comprises:
      obtaining resource data that is of a sensing device of a same type as the destination device and that is located in the preset space; and
      generating the substitution data according to the resource data.

4. The method according to claim 3, wherein generating the substitution data according to the resource data comprises:
   if there are multiple pieces of the resource data, obtaining an average value of the multiple pieces of resource data and using the average value as the substitution data; or
   if there is one piece of the resource data, using the one piece of resource data as the substitution data.

5. The method according to claim 2, wherein the type of the destination device is a steady output type, and an absolute value of a difference between pieces of resource data that are of a device of the steady output type and that are at adjacent moments is smaller than a preset value; and
   wherein generating the substitution data according to the type of the destination device comprises: obtaining resource data of the destination device at a previous moment and using the resource data as the substitution data.

6. The method according to claim 2, wherein the type of the destination device is a predictable output type, and there is a preset function relationship between pieces of resource data that are of a device of the predictable output type and that are at adjacent moments; and
wherein generating the substitution data according to the type of the destination device comprises:
obtaining resource data of the destination device at a previous moment;
obtaining a correlation function of the destination device, wherein the correlation function is used to indicate a preset function relationship between the resource data at the previous moment and resource data at a current moment; and
performing a calculation according to the resource data at the previous moment and the correlation function to obtain the substitution data.

7. The method according to claim 1, wherein the response substitution information further comprises an information substitution identifier, and the information substitution identifier is used to indicate whether the resource data requested by the query request is substituted.

8. A response message processing method, comprising:
sending, by a request device, a device identifier to a common service entity (CSE) to facilitate the CSE sending, according to the device identifier, a query request to a destination device corresponding to the device identifier, wherein the query request is for requesting resource data from the destination device; and
receiving, by the request device, response substitution information sent by the CSE, wherein the response substitution information is generated by the CSE based on an error relating to a response message sent by the destination device, wherein the response substitution information comprises substitution data and the device identifier, and wherein the substitution data is for substituting the resource data requested by the query request;
wherein before receiving the response substitution information sent by the CSE, the method further comprises:
receiving a response message sent by the CSE;
detecting whether resource data in the response message conforms to a preset rule;
in response to the resource data in the response message not conforming to the preset rule, determining that a content error has occurred with respect to the response message;
generating a re-retrieval message, wherein the re-retrieval message is used to indicate that a content error has occurred with respect to the response message; and
sending the re-retrieval message to the CSE.

9. The method according to claim 8, wherein the response substitution information further comprises an information substitution identifier, and the information substitution identifier is used to indicate whether the resource data requested by the query request is substituted; and
wherein after receiving the response substitution information sent by the CSE, the method further comprises:
detecting the information substitution identifier; and
determining, according to a detection result, whether the resource data requested by the query request is substituted.

10. A common service entity (CSE), comprising a processor and a non-transitory computer-readable medium having processor-executable instructions stored thereon for response message processing, the processor-executable instructions, when executed by the processor, facilitating performance of the following:
sending, according to a device identifier sent by a request device, a query request to a destination device corresponding to the device identifier to facilitate the destination device returning a response message according to the query request, wherein the query request is for requesting resource data from the destination device;
generating substitution data based on an error relating to the response message, wherein the substitution data is for substituting the resource data requested by the query request; and
sending response substitution information to the request device, wherein the response substitution information comprises the substitution data and the device identifier;
wherein the processor-executable instructions, when executed, further facilitate:
receiving the response message sent by the destination device;
detecting whether content of the response message is null; and
in response to the content of the response message being null, determining that an error relating to the response message has occurred, wherein the error relating to the response message is a transmission error.

11. The CSE according to claim 10, wherein generating the substitution data comprises:
obtaining a type of the destination device; and
generating the substitution data according to the type of the destination device.

12. The CSE according to claim 11, wherein the type of the destination device is a sensing type, and a device of the sensing type is configured to sense a preset attribute in a preset space; and
wherein generating the substitution data according to the type of the destination device comprises:
obtaining resource data that is of a sensing device of a same type as the destination device and that is located in the preset space; and
generating the substitution data according to the resource data.

13. The CSE according to claim 12, wherein generating the substitution data according to the resource data comprises:
if there are multiple pieces of the resource data, obtaining an average value of the multiple pieces of resource data and using the average value as the substitution data; or
if there is one piece of the resource data, using the one piece of resource data as the substitution data.

14. The CSE according to claim 11, wherein the type of the destination device is a steady output type, and an absolute value of a difference between pieces of resource data that are of a device of the steady output type and that are at adjacent moments is smaller than a preset value; and
wherein generating the substitution data according to the type of the destination device comprises: obtaining resource data of the destination device at a previous moment and using the resource data as the substitution data.

15. The CSE according to claim 11, wherein the type of the destination device is a predictable output type, and there is a preset function relationship between pieces of resource data that are of a device of the predictable output type and that are at adjacent moments; and
wherein generating the substitution data according to the type of the destination device comprises:
obtaining resource data of the destination device at a previous moment;

obtaining a correlation function of the destination device, wherein the correlation function indicates a preset function relationship between the resource data at the previous moment and resource data at a current moment; and performing a calculation according to the resource data at the previous moment and the correlation function; to obtain the substitution data.

16. The CSE according to claim 10, wherein the response substitution information further comprises an information substitution identifier, and the information substitution identifier indicates whether the resource data requested by the query request is substituted.

17. A request device, comprising a processor and a non-transitory computer-readable medium having processor-executable instructions stored thereon for response message processing, the processor-executable instructions, when executed by the processor, facilitating performance of the following:

sending a device identifier to a common service entity (CSE) to facilitate the CSE sending, according to the device identifier, a query request to a destination device corresponding to the device identifier, wherein the query request is for requesting resource data from the destination device; and receiving response substitution information sent by the CSE, wherein the response substitution information is generated by the CSE based on an error relating to a response message sent by the destination device, wherein the response substitution information comprises substitution data and the device identifier, and wherein the substitution data is for substituting the resource data requested by the query request;

wherein the processor-executable instructions, when executed, further facilitate, before receiving the response substitution information sent by the CSE:

receiving a response message sent by the CSE;

detecting whether resource data in the response message conforms to a preset rule;

in response to the resource data in the response message not conforming to the preset rule, determining that a content error has occurred with respect to the response message;

generating a re-retrieval message, wherein the re-retrieval message indicates that a content error has occurred with respect to the response message; and sending the re-retrieval message to the CSE.

18. The request device according to claim 17, wherein the response substitution information further comprises an information substitution identifier, the information substitution identifier indicates whether the resource data requested by the query request is substituted, and the processor-executable instructions, when executed, further facilitate:

detecting the information substitution identifier; and determining, according to a detection result, whether the resource data requested by the query request is substituted.

19. A response message processing system, comprising:

a common service entity (CSE), a request device, and a destination device;

wherein the CSE is configured to: send, according to a device identifier sent by the request device, a query request to the destination device corresponding to the device identifier, wherein the query request requests resource data from the destination device; generate substitution data based on an error relating to a response message, wherein the substitution data is for substituting the resource data requested by the query request; and send response substitution information to the request device, wherein the response substitution information comprises the substitution data and the device identifier;

wherein the request device is configured to receive the response message; determine whether a content error has occurred with respect to the response message; and send a re-retrieval message to the CSE, wherein the re-retrieval message indicates that a content error has occurred with respect to the response message; and wherein the destination device is configured to return the response message to the CSE according to the query request.

20. A non-transitory computer-readable medium having processor-executable instructions stored thereon for response message processing, the processor-executable instructions, when executed, facilitating performance of the following:

sending, according to a device identifier sent by a request device, a query request to a destination device corresponding to the device identifier to facilitate the destination device returning a response message according to the query request, wherein the query request is for requesting resource data from the destination device;

generating substitution data based on an error relating to the response message, wherein the substitution data is for substituting the resource data requested by the query request; and sending response substitution information to the request device, wherein the response substitution information comprises the substitution data and the device identifier;

wherein the error relating to the response message comprises a content error, and wherein the processor-executable instructions, when executed, further facilitate, before generating the substitution data;

receiving the response message sent by the destination device;

sending the response message to the request device to facilitate the request device determining whether a content error has occurred with respect to the response message; and receiving a re-retrieval message sent by the request device, wherein the re-retrieval message indicates that a content error has occurred with respect to the response message.

21. The non-transitory computer-readable medium according to claim 20, wherein generating the substitution data comprises:

obtaining a type of the destination device; and generating the substitution data according to the type of the destination device.

22. The non-transitory computer-readable medium according to claim 21, wherein the type of the destination device is a sensing type, and a device of the sensing type is configured to sense a preset attribute in a preset space; and wherein generating the substitution data according to the type of the destination device comprises:

obtaining resource data that is of a sensing device of a same type as the destination device and that is located in the preset space; and generating the substitution data according to the resource data.

23. The non-transitory computer-readable medium according to claim 22, wherein generating the substitution data according to the resource data comprises:

if there are multiple pieces of the resource data, obtaining an average value of the multiple pieces of resource data and using the average value as the substitution data; or if there is one piece of the resource data, using the one piece of resource data as the substitution data.

24. The non-transitory computer-readable medium according to claim 21, wherein the type of the destination device is a steady output type, and an absolute value of a difference between pieces of resource data that are of a device of the steady output type and that are at adjacent moments is smaller than a preset value; and wherein generating the substitution data according to the type of the destination device comprises: obtaining resource data of the destination device at a previous moment and using the resource data as the substitution data.

25. The non-transitory computer-readable medium according to claim 21, wherein the type of the destination device is a predictable output type, and there is a preset function relationship between pieces of resource data that are of a device of the predictable output type and that are at adjacent moments; and wherein generating the substitution data according to the type of the destination device comprises:

obtaining resource data of the destination device at a previous moment;

obtaining a correlation function of the destination device, wherein the correlation function indicates a preset function relationship between the resource data at the previous moment and resource data at a current moment; and performing a calculation according to the resource data at the previous moment and the correlation function; to obtain the substitution data.

26. The non-transitory computer-readable medium according to claim 20, wherein the response substitution information further comprises an information substitution identifier, and the information substitution identifier indicates whether the resource data requested by the query request is substituted.

27. A non-transitory computer-readable medium having processor-executable instructions stored thereon for response message processing, the processor-executable instructions, when executed by the processor, facilitating performance of the following:

sending a device identifier to a common service entity (CSE) to facilitate the CSE sending, according to the device identifier, a query request to a destination device corresponding to the device identifier, wherein the query request requests resource data from the destination device; and receiving response substitution information sent by the CSE, wherein the response substitution information is generated by the CSE based on an error relating to a response message sent by the destination device, wherein the response substitution information comprises substitution data and the device identifier, and wherein the substitution data is for substituting the resource data requested by the query request;

wherein the processor-executable instructions, when executed, further facilitate, before receiving the response substitution information sent by the CSE:

receiving a response message sent by the CSE;

detecting whether resource data in the response message conforms to a preset rule;

in response to the resource data in the response message not conforming to the preset rule, determining that a content error has occurred with respect to the response message;

generating a re-retrieval message, wherein the re-retrieval message indicates that a content error has occurred with respect to the response message; and sending the re-retrieval message to the CSE.

28. The non-transitory computer-readable medium according to claim 27, wherein the response substitution information further comprises an information substitution identifier, the information substitution identifier indicates whether the resource data requested by the query request is substituted, and the processor-executable instructions, when executed, further facilitate:

detecting the information substitution identifier; and determining, according to a detection result, whether the resource data requested by the query request is substituted.

* * * * *